United States Patent
Nystad

(10) Patent No.: US 10,152,763 B2
(45) Date of Patent: Dec. 11, 2018

(54) GRAPHICS PROCESSING SYSTEMS

(71) Applicant: ARM Limited, Cambridge (GB)

(72) Inventor: Jorn Nystad, Trondheim (NO)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 15/218,015

(22) Filed: Jul. 23, 2016

(65) Prior Publication Data
US 2017/0032488 A1 Feb. 2, 2017

(30) Foreign Application Priority Data

Jul. 30, 2015 (GB) .................................. 1513425.7

(51) Int. Cl.
G06T 1/20 (2006.01)
(52) U.S. Cl.
CPC ...................................... G06T 1/20 (2013.01)
(58) Field of Classification Search
CPC ........... G06T 1/20; G06T 1/60; G06T 15/005; G06T 15/80; G06T 2210/52
See application file for complete search history.

(56) References Cited

U.S. PATENT DOCUMENTS

| 5,353,418 A | 10/1994 | Nikhil | |
| 2003/0172190 A1* | 9/2003 | Greenblat | H04L 12/422 709/251 |
| 2004/0158736 A1* | 8/2004 | Watt | G06F 9/4812 713/166 |
| 2007/0130447 A1* | 6/2007 | Coon | G06F 9/3838 712/215 |
| 2007/0143582 A1* | 6/2007 | Coon | G06F 9/3009 712/235 |
| 2009/0320048 A1* | 12/2009 | Watt | G06F 9/4812 719/319 |
| 2011/0078689 A1* | 3/2011 | Shebanow | G06F 12/0284 718/102 |

(Continued)

OTHER PUBLICATIONS

EP Search and Examination Report dated Jan. 7, 2016, UK Patent Application GB1513425.7.

(Continued)

Primary Examiner — Abderrahim Merouan
Assistant Examiner — Phuc N Doan
(74) Attorney, Agent, or Firm — Vierra Magen Marcus LLP

(57) ABSTRACT

The present disclosure relates to a graphics processors and graphics processing systems. In the graphics processor, the rasterizer may operate to identify pairs of fragments for a primitive being rendered for which not all the sampling positions in the fragments are covered by the primitive. When the fragments reach the fragment shader, corresponding execution threads may be spawned for execution by the fragment shader to process the fragments. A first part of the fragment shader program that uses the helper threads of the thread groups may then be executed. There may then be a merge instruction in the fragment shader program which operates to cause the active threads of the thread groups to be merged into a single, combined thread group. Following this thread group merger, the remaining program steps of the fragment shader program may be executed for the merged thread group.

17 Claims, 11 Drawing Sheets

(56) References Cited

U.S. PATENT DOCUMENTS

| | | | |
|---|---|---|---|
| 2012/0096474 A1* | 4/2012 | Jiao | G06F 9/485 |
| | | | 718/107 |
| 2012/0110586 A1* | 5/2012 | Coon | G06F 9/4881 |
| | | | 718/102 |
| 2013/0042090 A1* | 2/2013 | Krashinsky | G06F 9/3016 |
| | | | 712/214 |
| 2013/0241941 A1* | 9/2013 | Donaldson | G06F 9/44589 |
| | | | 345/505 |
| 2014/0092091 A1* | 4/2014 | Li | G06T 17/20 |
| | | | 345/423 |
| 2014/0129783 A1* | 5/2014 | Marathe | G06F 9/38 |
| | | | 711/147 |
| 2014/0143755 A1* | 5/2014 | Grover | G06F 8/458 |
| | | | 717/110 |
| 2014/0257769 A1* | 9/2014 | Sakharnykh | G06F 19/701 |
| | | | 703/2 |
| 2015/0052533 A1* | 2/2015 | Jang | G06F 9/4843 |
| | | | 718/102 |
| 2015/0095914 A1 | 4/2015 | Mei | |
| 2015/0161757 A1 | 6/2015 | Li | |
| 2015/0378733 A1* | 12/2015 | Beylin | G06F 9/3887 |
| | | | 712/226 |
| 2016/0132338 A1* | 5/2016 | Jin | G06F 9/3851 |
| | | | 712/206 |

OTHER PUBLICATIONS

Brunie, et al., "Simultaneous Branch and Warp Interweaving for Sustained GPU Performance" 2011. <ensl-00649650v1>.

* cited by examiner

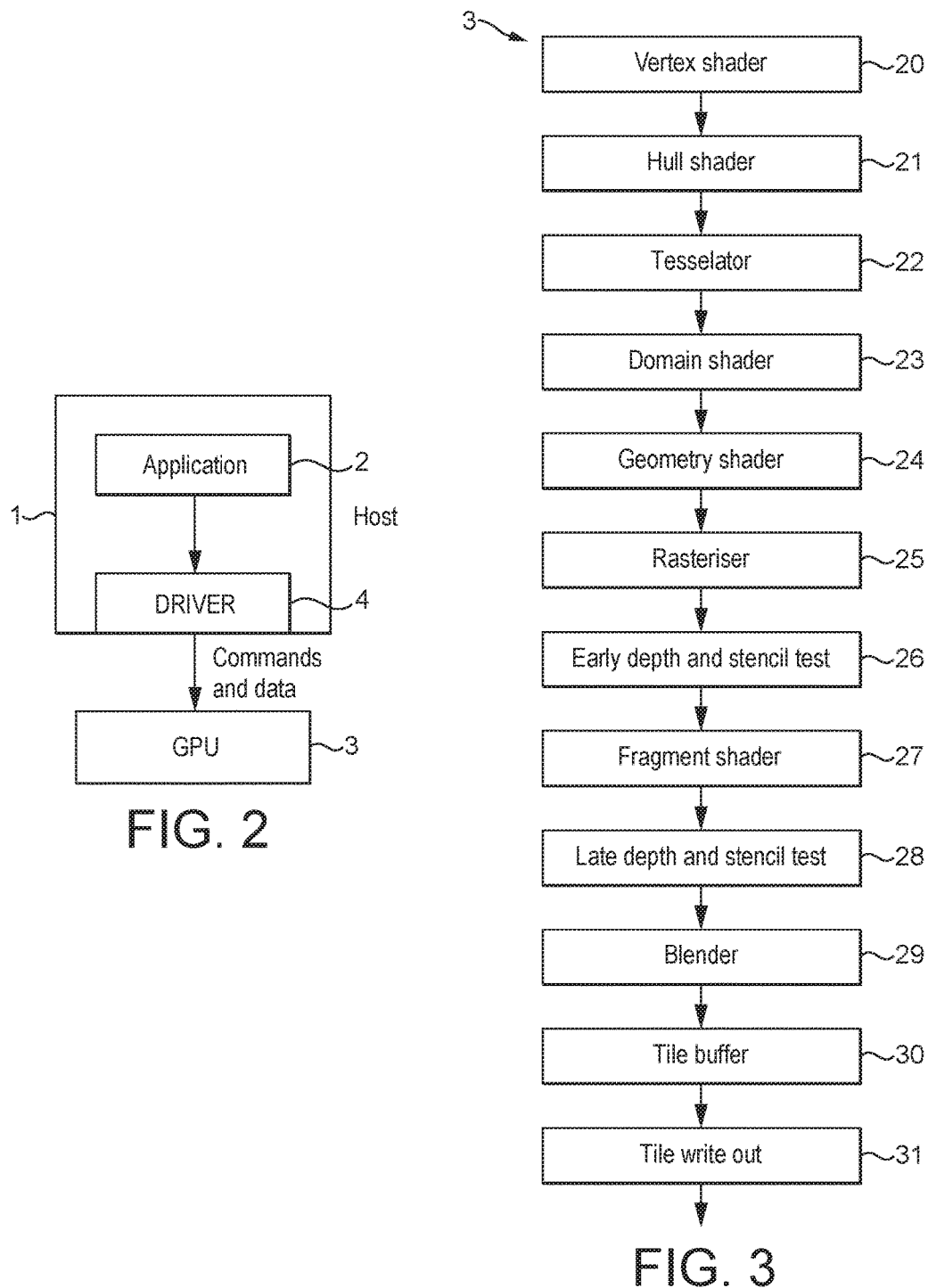

GRAPHICS PROCESSING SYSTEMS

BACKGROUND

The technology described herein relates to graphics processors, and in particular to the operation of graphics processors that include one or more programmable processing stages ("shaders").

Graphics processing is typically carried out in a pipelined fashion, with one or more pipeline stages operating on the data to generate the final render output, e.g. frame that is displayed. Many graphics processing pipelines now include one or more programmable processing stages, commonly referred to as "shaders". For example, a graphics processing pipeline may include one or more of, and typically all of, a geometry shader, a vertex shader and a fragment (pixel) shader. These shaders are programmable processing stages that execute shader programs on input data values to generate a desired set of output data (e.g. appropriately shaded and rendered fragment data in the case of a fragment shader) for processing by the rest of the graphics pipeline and/or for output. The shaders of the graphics processing pipeline may share programmable processing circuitry, or they may each be distinct programmable processing units.

A graphics processing unit (GPU) shader core is thus a processing unit that performs graphics processing by running small programs for each graphics item in a graphics output to be generated, such as a render target, e.g. frame (an "item" in this regard is usually a vertex or a sampling position (e.g. in the case of a fragment shader). This generally enables a high degree of parallelism, in that a typical render output, e.g. frame, features a rather large number of vertices and fragments, each of which can be processed independently.

In graphics shader operation, each "item" will be processed by means of an execution thread which will execute the shader program in question for the graphics "item" in question.

A known way to improve shader execution efficiency is to group execution threads (where each thread corresponds, e.g., to one vertex or one sampling position) into "groups" or "bundles" of threads, where the threads of one group are run in lockstep, one instruction at a time. In this way, it is possible to share instruction fetch and scheduling resources between all the threads in the group. (Other terms used for such thread groups include "warps" and "wavefronts". For convenience the term "thread group" will be used herein, but this is intended to encompass all equivalent terms and arrangements, unless otherwise indicated.)

In the case of fragment shaders (shaders that are run once for each sampling position in a primitive of a render output), a thread group typically contains one or more "quads", where a "quad" is a 2×2 group of sampling positions. Organising sampling positions into quads in this manner is beneficial for some of the operations done in a fragment shader, such as sampling point-delta calculations and operations that depend on such sampling point-deltas, such as texture lookups with mipmapping.

The Applicants have recognised that in such arrangements, at the edge of a primitive, the 2×2 sampling position quad may straddle the edge of the primitive, with some of the sampling positions being inside the primitive and other sampling positions being outside. In this case, threads will still be started for all four sampling positions in the quad, but in effect only those sampling positions that are covered by the primitive will be "active" threads.

However, some fragment shading processing is still required for the threads that correspond to sampling positions that are outside the primitive (which will be referred to herein as "inactive" and/or "helper" threads for convenience). This is because, for example, some of the fragment shading results for such inactive ("helper") threads are needed as inputs to some of the fragment shading operations, such as sampling position-delta type calculations. (The results computed by such helper threads are then discarded at the end of the fragment shader (as they are not otherwise required).)

FIG. 1 illustrates this situation.

FIG. 1 shows schematically an array 101 of sampling positions 102 of a graphics output to be generated, in which respective 2×2 groups of sampling positions are organised into "quads" 103 that will be processed in common.

When a primitive is rasterised, the rasteriser will identify those sampling position quads (groups) that are at least partially covered by the primitive, and issue a graphics fragment for rendering for each at least partially covered quad (group (set) of sampling positions). Each such fragment will then be processed by the fragment shader as a thread group (warp), with each covered sampling position being an "active" thread in the group (warp) and any uncovered sampling positions being inactive ("helper") threads.

FIG. 1 shows an exemplary primitive 104 overlaying the array of sampling positions. It can be seen from FIG. 1 that when the sampling position quad 105 falls to be processed for the primitive 103, three of the sampling positions within the 2×2 quad 105 will be "active" (i.e. represent sampling positions within the primitive 3), but the fourth sampling position 106 in the quad 104 will be "inactive" as it falls outside the edge of the primitive 103. Thus, when the fragment shader program is executed for the quad 104, the thread within the thread group for the uncovered sampling position 106 will be executed and treated as a "helper" thread.

The Applicants believe that there remains scope for improvements to the handling of thread groups, particularly in shaders of graphics processing pipelines.

BRIEF DESCRIPTION OF THE DRAWINGS

A number of embodiments of the technology described herein will now be described by way of example only and with reference to the accompanying drawings, in which:

FIG. 2 shows an exemplary computer graphics processing system;

FIG. 3 shows schematically a graphics processing pipeline that can be operated in the manner of the technology described herein;

Like reference numerals are used for like components where appropriate in the drawings.

DETAILED DESCRIPTION

Figure 1:
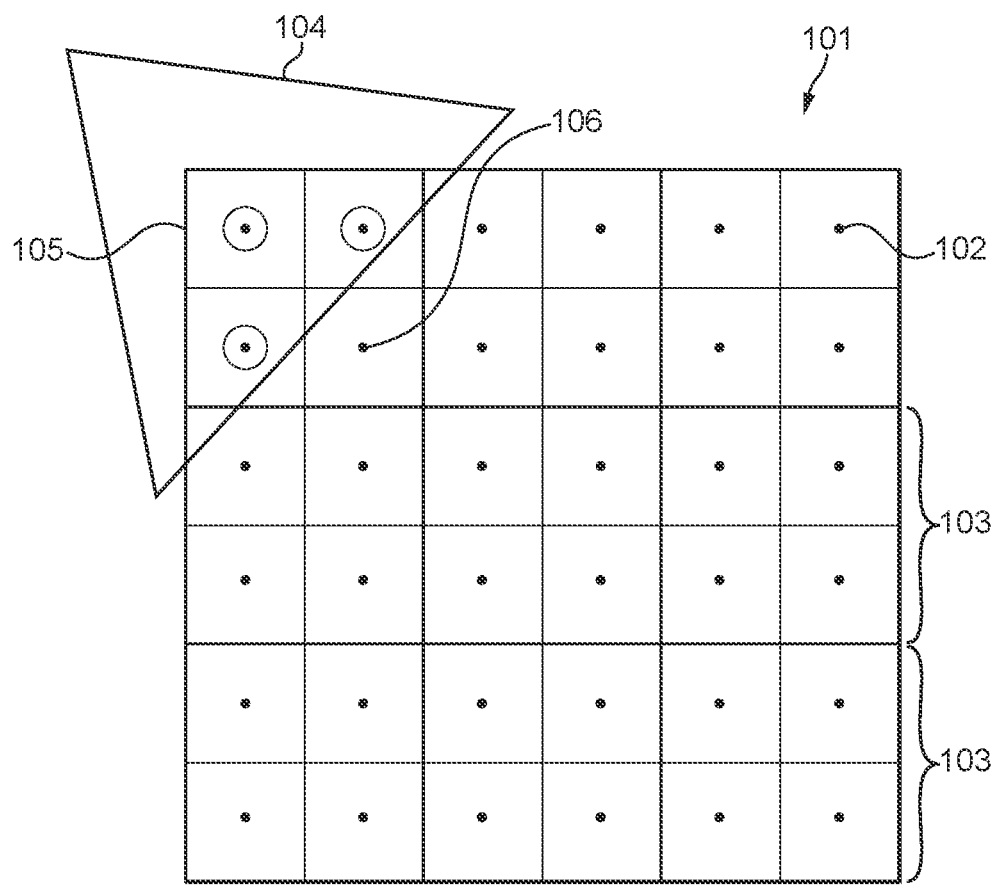
FIG. 1 shows schematically a primitive overlaying a grid of sampling points.

A first embodiment of the technology described herein comprises a method of operating a graphics processing pipeline which includes a programmable shading stage that executes instructions to perform shading operations, in which execution threads may be grouped together into thread groups in which the threads of the group are executed in lockstep, one instruction at a time, the method comprising:

issuing to the shader stage a shader program for execution by the shader stage to process execution threads for generating a render output, together with a thread group merge event indication that indicates a point in the shader program execution where thread groups for which not all the threads in the thread group are active may be merged;

the graphics processing pipeline:
identifying a set of two or more thread groups to be processed by the shading stage for which not all the threads in the thread groups are active and which may be merged into a single thread group; and the shading stage:
executing the shader program for the identified thread groups, the executing the shader program for the identified thread groups including:
when the identified thread groups have reached the thread group merge event indication, merging the thread groups into a single thread group containing the active threads from each of the thread groups; and
executing further instructions in the shader program after the merge event indication point for the merged thread group.

A second embodiment of the technology described herein comprises a data processing system comprising:
a graphics processing pipeline that includes a programmable shading stage that executes instructions to perform shading operations, and in which execution threads may be grouped together into thread groups in which the threads of the group are executed in lockstep, one instruction at a time, and
a compiler that compiles programs for the shading stage to generate instructions for execution by the shading stage;
wherein the compiler is configured to:
issue to the shader stage a shader program for execution by the shader stage to process execution threads for generating a render output, together with a thread group merge event indication that indicates a point in the shader program execution where thread groups for which not all the threads in the thread group are active may be merged;
the graphics processing pipeline is configured to:
identify respective sets of two or more thread groups to be processed by the shading stage for which not all the threads in the thread groups are active and which may be merged into a respective single thread group; and
the shading stage is configured to:
execute the shader program for the identified thread groups, the executing the shader program for the identified thread groups including:
when thread groups of a respective identified set of mergeable thread groups have reached the thread group merge event indication, merging the thread groups into a single thread group containing the active threads from each of the thread groups; and
executing further instructions in the shader program after the merge event indication point for the merged thread group.

The technology described herein relates to the execution of shader programs in graphics processing pipelines in which execution threads may be grouped together into thread groups ("warps"). In the technology described herein, thread groups that have some "non-active" ("helper") threads are identified, and then a "merge event" indication is used to trigger the merging of those thread groups into a single thread group for execution containing the active threads of the thread groups during the shader execution. As will be discussed further below, this then has the effect of reducing the overall processing that is required in the situation where thread groups have only some "active" threads (e.g. threads that relate to covered sampling positions).

The Applicants have recognised in this regard, that while, as discussed above, it can be necessary to, when executing a fragment shader program, for example, execute that program for inactive (non-covered) "helper threads", e.g. for the purposes of generating inputs to sampling position-delta type calculations, those calculations may only occur (and/or can be arranged only to occur) near the beginning of the fragment shader program. This then means that the inactive, "helper" threads can potentially be terminated once the calculations that they are required for have been performed. Such early termination of the "helper threads" will in itself help to save power.

However, the Applicants have further recognised that even if a "helper thread" is terminated in this way, that will not in itself allow the thread group as a whole to be terminated (i.e. the "helper thread" will still occupy a thread group execution lane even if it doesn't perform any calculation, and thus unnecessarily occupy execution cycles, even though it is no longer needed to be processed). This can become particularly wasteful for workloads with large numbers of small primitives and long shader programs (which are workloads frequently seen in modern games, for example).

The technology described herein addresses this by identifying and indicating a thread group merge event opportunity in the shader program, after which thread groups having inactive, "helper" threads are merged into a single thread group containing the "active" threads of the original "sparsely" active thread groups. This then effectively avoids the inactive, "helper" threads of the original thread groups occupying execution cycles.

The thread groups that are considered in the technology described herein can be any suitable and desired size. In some embodiments each thread group contains four threads (i.e. there is a warp width of four). In this case, in one embodiment each thread group (warp) corresponds to a 2×2 sampling position "quad". However, other arrangements, such as the use of wider thread groups (warps) would be possible, if desired.

The programmable shading stage of the graphics processing pipeline can comprise any suitable and desired programmable shading stage ("shader") of the graphics processing pipeline. However, it is envisaged that the present application will have particular application to fragment shading operations, and thus in an embodiment the programmable shading stage operates as (is operating as) a programmable fragment shading stage (fragment shader). The programmable shading stage may operate solely as a fragment shader, but it will be appreciated in this regard that the programmable shading stage may typically be able to (and in an embodiment can) run shaders other than just fragment shaders, i.e. such that there may be one or more programmable stages of the graphics processing pipeline that may be appropriately programmed, e.g. at different times, to function as a fragment shader (to perform fragment shading operations) and to function as other forms (types) of shader.

Correspondingly the shader program that is issued to the (programmable) shader stage can be any suitable and desired shader program for execution by the programmable shading stage, but in an embodiment is a fragment shader program (a program for executing fragment shading operations) (and can comprise any suitable and desired fragment shader program for execution by the programmable shading stage).

The program should (and in an embodiment does) produce some useful output data, e.g. graphics processing output data for use in (subsequent) graphics processing operations, such as (an array of) vertex data, (an array of) fragment data etc. Thus, in an embodiment, the programmable execution unit executes a program so as to generate (an array of) graphics processing output data.

The generated output data may be further processed (in an embodiment for display), e.g. by a graphics processing pipeline, and/or provided to a display for display. Thus, in an embodiment, the generated output data is further processed, e.g. for display. In an embodiment, the generated output data is used to provide an image for display, e.g. is provided to a display for display.

The render output that is being generated can be any suitable and desired render output of a graphics processing pipeline. In one embodiment the render output is a frame (image) to be displayed, but the technology described herein is equally applicable for other forms of render outputs, such as textures (in a render-to-texture operation), etc.

The thread group merge event indication that is included in the shader program can take any suitable and desired form that can indicate (and be used by the shader to identify) the opportunity to merge thread groups.

In one embodiment the thread group merge indication is provided as or as part of an instruction in the shader program. For example, the thread group merge indication could be provided as a specific instruction (a "merge" instruction) that is included in the shader program. It would also be possible to indicate the thread group merge event opportunity by means of a modifier of or to an instruction in the shader program.

In other embodiments, the thread group merge event indication is not included as or as part of an instruction in the shader program, but is instead indicated in some other way that can indicate the thread group merge event point in the shader program, such as a cutoff point specified separately from the shader program code itself. In this case, the merge event point could be indicated, e.g., as a specific number of instructions of the shader program having been executed, and/or a particular program counter value being reached, whilst executing the shader program.

The thread group merge event indication can be provided in or in relation to the shader program in any suitable and desired manner and by any suitable and desired element of the overall data processing system.

In an embodiment, the thread group merge event indication is provided by the compiler (the shader compiler) for the graphics processing pipeline. Thus, in an embodiment, the compiler, e.g., inserts a thread group merge event instruction at the appropriate point in the, e.g. fragment, shader program, or adds a thread group merge event modifier to an instruction in the shader program, or otherwise generates the indication of the cutoff point for the thread group merge event indication. Having the compiler provide the thread group merge event indication has the advantage that the compiler is able to assess the shader program to determine if it is possible to include a thread group merge event indication in the shader program execution.

In an embodiment, the compiler analyses the shader program code that is provided, e.g. by the application on the host processor that requires the graphics processing, determines whether a thread group merge event at some point in the shader program execution is possible, and if so, then provides the thread group merge event indication at and for the appropriate point in the shader program (e.g. by inserting a specific instruction in the shader program at that point, or otherwise) to indicate the thread group merge event opportunity.

In an embodiment, the compiler is also operable to (where this is possible) re-order operations in the shader program so as to, e.g., provide an opportunity to include a thread group merge event in the shader program execution, and/or so as to allow for the more efficient inclusion and use of a thread group merge event opportunity in the execution of the shader program.

In this regard, in an embodiment the compiler operates to place any shader program operations that require results for inactive threads, such as texture lookups, before the thread group merge event indication point. Correspondingly, in an embodiment the compiler places any shader program operations, such as arithmetic operations, that do not need to be executed for inactive (helper) threads in a thread group, after the thread group merge event point in the shader program execution.

The compiler may, e.g., and in an embodiment does, run on a host processor of the overall data processing system that includes the graphics processing pipeline (with the graphics processing pipeline then being on another processor, such as a graphics processor, that is associated with the host processor (such that the compiler and compiled code run on separate processors within the overall data graphics processing system)). However, other arrangements would be possible, such as the compiler running on the same processor as the compiled code, or the compiler being run on a (completely) separate processor, such as the program being precompiled on a separate system and being distributed in a compiled form.

The operation in the manner of the technology described herein to identify and provide thread group merge event opportunities in a shader program to be executed can be (and in one embodiment is) considered for each and every shader program that is to be executed by the graphics processing pipeline. It would also be possible to try to identify and provide thread group merge event opportunities only for particular categories or types of shader programs but not for other categories or types of shader programs (e.g. where the type of shader program is unlikely to offer useful thread group merge event opportunities).

In some embodiments the operation in the manner of the technology described herein to identify and provide thread group merge event opportunities is performed for fragment shader programs to be executed (and, in an embodiment, for each and every fragment shader program that is to be executed by the graphics processing pipeline).

(However, it is not necessary that each and every, e.g. fragment, shader program has to have a thread group merge event indication and point included in it, for example where the compiler determines that a suitable merge event point does not exist or may not be so useful in the shader program in question.)

It would also be possible to include multiple thread group merge event points in a shader program, if desired. This could be useful when, for example, the bulk of the shader program is contained in an IF-block, such that it might be appropriate to put one merge point in the middle of the IF-block and a second merge point just after the end of the IF-block in the shader program execution. In this case, in an embodiment all the active threads in a thread group have to hit at least one of the merge points before the merge event can take place.

The technology described herein also extends to the compiler itself.

Thus, another embodiment of the technology described herein comprises a compiler that compiles programs to generate instructions for a shading stage of a graphics processing pipeline that executes instructions to perform shading operations, and in which execution threads may be grouped together into thread groups in which the threads of the group are executed in lockstep, one instruction at a time;

wherein the compiler is configured to, for a shader program to be executed by a shader stage:

determine whether there is a point within the execution of the shader program where two or more thread groups each having inactive threads may be merged; and when it is determined that there is a point in the shader program execution where two or more thread groups having inactive threads may be merged, include in or provide with the shader program, a thread group merge event indication that indicates a point in the shader program execution where two or more thread groups, each having inactive threads, may be merged.

Another embodiment of the technology described herein comprises a method of compiling a program to generate instructions for a shading stage of a graphics processing pipeline that executes instructions to perform shading operations, and in which execution threads may be grouped together into thread groups in which the threads of the group are executed in lockstep, one instruction at a time;

the method comprising, for a shader program to be executed by a shader stage:

determining whether there is a point within the execution of the shader program where two or more thread groups each having inactive threads may be merged; and when it is determined that there is a point in the shader program execution where two or more thread groups having inactive threads may be merged, including in or providing with the shader program, a thread group merge event indication that indicates a point in the shader program execution where two or more thread groups, each having inactive threads, may be merged.

The technology described herein also extends to a shader stage of a graphics processing pipeline that can merge thread groups in response to a thread group merge indication for a shader program being executed by the shader stage.

Thus, another embodiment of the technology described herein comprises a shader stage of a graphics processing pipeline that executes instructions to perform shading operations, and in which execution threads may be grouped together into thread groups in which the threads of the group are executed in lockstep, one instruction at a time, the shader stage being configured to:

when executing instructions of a shader program, in response to a thread group merge event indication that indicates a point in the shader program execution where two or more thread groups may be merged associated with the shader program:

determine whether two or more thread groups for which the shader program is being executed and that can be merged into a single thread group exist; and when two or more thread groups which may be merged into a single thread group exist, merge the thread groups into a single thread group containing the active threads from each of the thread groups; and execute further instructions in the shader program after the merge event indication for the merged thread group.

Another embodiment of the technology described herein comprises a method of operating a shader stage of a graphics processing pipeline that executes instructions to perform shading operations, and in which execution threads may be grouped together into thread groups in which the threads of the group are executed in lockstep, one instruction at a time;

the method comprising the shader stage, when executing instructions of a shader program, in response to a thread group merge event indication that indicates a point in the shader program execution where two or more thread groups may be merged associated with the shader program:

determining whether two or more thread groups for which the shader program is being executed and that can be merged into a single thread group exist; and when two or more thread groups which may be merged into a single thread group exist, merging the thread groups into a single thread group containing the active threads from each of the thread groups; and executing further instructions in the shader program after the merge event indication for the merged thread group.

As will be appreciated by those skilled in the art, these embodiments of the technology described herein can and, for some embodiments do include any one or more or all of the optional features of the technology described herein, as appropriate. Thus, for example, in an embodiment the shader program is a fragment shader program, and, correspondingly, in an embodiment the shader stage is (operating as) a fragment shader stage of the graphics processing pipeline.

The identification of a set (of the sets) of two or more thread groups for which not all the threads in the thread groups are active, and which may be merged into a single thread group, can be performed in any suitable and desired manner by, and element of, the graphics processing pipeline. This may depend, for example, upon the shader program and shader stage that is being executed.

In an embodiment, at least in the case of the shader program being a fragment shader program (and accordingly the programmable shading stage acting as a fragment shading stage (fragment shader)), the rasteriser of the graphics processing pipeline identifies the set or sets of two or more thread groups for which not all the threads in the thread groups are active, which may be merged into a single thread group, e.g., and in an embodiment, as it rasterises primitives to generate fragments, e.g. quads (or other groupings) of sampling positions, for rendering.

As discussed above, the rasteriser of the graphics processing pipeline will test primitives to be rendered against sampling positions of the render output being generated, and generate fragments to be rendered for each sampling position (or respective set of sampling positions (e.g. each 2×2 quad of sampling positions)) that is covered by (or that includes at least one sampling position that is covered by) the primitive in question.

The fragments that are generated by the rasteriser for rendering a primitive are then sent to the rest of the graphics processing pipeline (including the fragment shading stage) for processing. Each fragment will accordingly correspond to and be used to render a set of sampling positions (with each set of sampling positions comprising one sampling position or plural sampling positions, depending upon whether the fragments represent individual sampling positions or sets, e.g. quads, of plural sampling positions).

Then, at the fragment shading stage each fragment (i.e. the set of sampling positions that the fragment represents) will be processed as a respective thread group (warp), with each thread (and thus execution lane) in and for the thread group corresponding to a given sampling position in the set of sampling positions that the fragment represents. Covered sampling positions in the set of sampling positions for a fragment will thus be active threads of the thread group, and uncovered sampling positions will be inactive ("helper") threads of the thread group (warp).

All the thread groups in a set of thread groups to be (potentially) merged should, and in an embodiment do, run (execute) the same shader program. So long as this requirement is met, there is no need for the thread groups in a set of thread groups to be (potentially) merged to otherwise be associated in any particular way.

However, other requirements could be set, if desired. For example, the thread groups to be merged could have to belong to the same draw call (and in an embodiment this is what is done). Similarly, the thread groups in a set of thread groups to be (potentially) merged could have to relate to the same graphics primitive. However, this is not essential, and in an embodiment the thread groups in a set of thread groups to be (potentially) merged can relate to different primitives. Permitting thread groups in different primitives to be merged can be advantageous, especially in the case where the average primitive size is one sampling position quad or smaller.

The thread groups that are included in a set of thread groups to be (potentially) merged should each have at least one inactive thread (e.g. an uncovered sampling point), but can otherwise be selected as desired.

In one embodiment the (and each) set of thread groups that may be merged into a single thread group contains only two thread groups (i.e. pairs of thread groups that may be merged into, single thread groups are identified). However, it would also be possible to identify sets of three or more thread groups (warps) that may be merged into a single thread group, if desired.

The thread groups to be (potentially) merged should, and in an embodiment do, total between them no more than the maximum number of active threads that a single thread group can contain (as that then allows all the active threads for the thread groups to be merged into a single thread group). In an embodiment, thread groups that will combine to provide a "full" merged, single thread group are preferentially identified as merger candidates.

In an embodiment thread groups having non-overlapping active threads (i.e. for which the active threads reside in different thread group (warp) lanes) are identified as being thread groups that can be merged into a single thread group.

In one embodiment, only thread groups having non-overlapping active threads (i.e. for which the active threads reside in different thread group (warp) lanes) are identified as being thread groups that can be merged into a single thread group.

However, in some embodiments, it is possible to (e.g., and in an embodiment the rasteriser is able to) re-map the allocation of threads (e.g. sampling positions) to thread group lanes for thread groups (e.g. by flipping the 2×2 quad that the thread group corresponds to horizontally or vertically), so as to (try to) remove the overlap for thread groups that in their initial configuration have overlapping active threads (lanes), to allow such thread groups then to be (potentially) merged.

Thus, in some embodiments, the, e.g., rasteriser, is able to remap the association of, e.g. sampling positions, that a thread group represents to the thread group execution (warp) lanes, so as to, for example, and in an embodiment, be able to remove active thread execution (warp) lane overlap between different thread groups.

In this case, in an embodiment, the remapping (reorientation) for a remapped thread group is tracked or otherwise recorded in some way so as to allow the, e.g. fragment, shading operation to still ensure that any shading operations performed on a "remapped" thread group are calculated correctly, and to allow the final results for the remapped thread group to be "unmapped" as needed, e.g. when they are to be committed to an output.

In an embodiment, the process of identifying sets of thread groups that can be merged is repeated, e.g. as fragments are generated for rendering by the rasteriser, as primitives are being rasterised, and/or as the render output in question is being generated. Thus, in some embodiments, plural pairs (or other sets) of thread groups that may be merged into single thread groups are identified. In an embodiment the, e.g., rasteriser, operates to identify pairs (or other groups) of thread groups that may be merged into respective single thread groups as it operates to rasterise primitives for rendering.

In some embodiments, the identified thread groups that can be merged into a respective single thread group are indicated to the shader stage of the graphics processing pipeline, so that the shader stage can identify the thread groups that have been identified (associated) as "merge" candidates when they reach the thread group merge event indication point in the shader program execution. This can be done in any suitable and desired manner. For example, and in an embodiment, the rasteriser can signal to the fragment shader stage those thread groups that can be merged together, as it issues the thread groups to the fragment shader.

In one way in which this could be done, the rasterizer keeps at its output a (e.g. small) queue of partial thread groups. When the rasterizer generates a new partial thread group, it will then match it against (compare it with) the partial thread groups in the queue in an attempt to find an earlier thread group with which it can be merged. If successful (i.e. if a suitable earlier thread group is found in the queue), the two thread groups can be issued to the fragment shader together. If not, the new partial thread group is inserted into the queue. It is possible that such a queue may become full, in which case unmerged partial thread groups could be passed into the fragment shader.

The technology described herein also extends to the operation of a rasteriser of a graphics processing pipeline identifying thread groups that may be merged into a single thread group.

Thus, another embodiment of the technology described herein comprises a method of operating a rasteriser of a graphics processing pipeline, which rasteriser rasterises graphics primitives to be rendered into graphics fragments for rendering, each graphics fragment representing a set of plural sampling positions of a render output to be generated; the method comprising the rasteriser:

identifying fragments for a primitive that include sampling positions that are not covered by the primitive and determining whether any of those fragments could be merged to form a single fragment that represents all the covered sampling points of the fragments; and when it is determined that two or more fragments that include uncovered sampling positions can be merged to form a single fragment that represents all the covered sampling points of the fragments, signalling to a fragment shading stage of the graphics processing pipeline that the two or more fragments that include uncovered sampling positions can be merged to form a single fragment that represents all the covered sampling points of the fragments.

Another embodiment of the technology described herein comprises a rasteriser for a graphics processing pipeline, which rasteriser rasterises graphics primitives to be rendered into graphics fragments for rendering, each graphics fragment representing a set of plural sampling positions of a render output to be generated;

wherein the rasteriser is configured to:

identify fragments for a primitive that include sampling positions that are not covered by the primitive and determine whether any of those fragments could be merged to form a single fragment that represents all the covered sampling points of the fragments; and when it is determined that two or more fragments that include uncovered sampling positions can be merged to form a single fragment that represents all the covered sampling points of the fragments, signal to a fragment shading stage of the graphics processing pipeline that the two or more fragments that include uncovered sampling positions can be merged to form a single fragment that represents all the covered sampling points of the fragments.

As will be appreciated by those skilled in the art, these embodiments of the technology described herein can and in some embodiments do include any one or more or all of the optional features of the technology described herein, as appropriate.

In some embodiments, the thread groups of a (and, in an embodiment, of each) set of thread groups that have been identified as being able to be merged into a single thread group are issued consecutively to the shading stage (although this is not essential and other arrangements would be possible).

Similarly, in some embodiments, any thread groups that are potentially to be merged with each other into a single thread group are issued to the shader stage for execution in a manner that is appropriate to and consistent with any restrictions for the handling of thread groups in the graphics processing pipeline. Thus, for example, in an embodiment where there are plural different register and/or memory banks available for the use of thread groups, any thread groups that are potentially to be merged with each other are issued to the shader stage for execution in such a manner that they will share the same memory bank and/or set of registers, etc.

The Applicants have further recognised that not all thread groups to be executed will be able to be (potentially) merged with another thread group or groups (e.g. because all the threads in the thread group (e.g. quad) are active or there is not another suitable thread group that the thread group could be merged with).

Thus, in an embodiment, if a thread group to be issued to the shader stage is identified (e.g. by the rasteriser) as being unable to be (potentially) merged with another thread group, then the thread group is, in an embodiment, indicated as being unable to be merged (as to be processed as a single thread group). This indication could, e.g., comprise simply omitting any indication that the thread group can be merged with another thread group.

Once the thread groups have been issued to the, e.g. fragment, shading stage, the shading stage will execute the shader program for the thread groups. Then, when the identified thread groups that may be merged into a single thread group have reached the thread group merge event indication, those thread groups are merged into a single thread group containing the active threads from each of the thread groups.

This may be implemented as desired, but in an embodiment when the first thread group of the set of thread groups that are to be merged reaches the thread group merge point in the shader program execution (e.g. reaches the thread group merge instruction), shader program execution for that thread group is stalled until the other thread group or groups that it is to be merged with have also reached the thread group merge point in the shader program execution. Then, once all (e.g. both) the thread groups that are to be merged have reached the thread group merge point in the shader program execution, the thread groups are merged into a single thread group containing the active threads from each of the thread groups.

The merging of the thread groups into a single thread group containing the active threads from each of the thread groups can be performed as desired. In some embodiments the active threads from each warp group are mapped to respective thread group (warp) lanes of the merged, single thread group (warp). In an embodiment one of the thread groups of the group of thread groups that is to be merged is retained as the single thread group containing the active threads from each of the thread groups, with the other thread group or groups in the set of thread groups that are to be merged then being terminated.

In an embodiment, after the thread group merge event, the thread groups that are merged proceed as one shared thread group (warp), sharing a single (active) program counter.

In execution of the shader program, any inactive threads that have not yet been terminated are, in an embodiment, terminated when the thread groups are merged. (In an embodiment any inactive "helper" threads in a thread group are terminated once the operations that they are required for have been performed.)

Once the associated thread groups have been merged into a single thread group, further instructions in the shader program are executed for the merged thread group. In an embodiment, the execution of the remaining instructions in the shader program after the merge event indication point is completed (appropriately) for the merged thread group.

As discussed above, there may be thread groups that cannot be merged with other thread groups. In an embodiment, when such an "unmergeable" thread group reaches the thread group merge event indication point in the shader program execution, the thread group merge event indication is ignored (has no effect), and the shader program is simply continued to be executed for the thread group on its own (i.e. the instructions in the shader program after the merge event indication point are executed for the thread group on its own). In other words, in an embodiment, for any thread groups that are not identified as being able to be merged with another thread group, the thread group merge event indication will have no effect on the execution of the shader program for the thread group.

The shader program that is executed by the shading stage for the thread groups will typically perform a sequence of instructions that read and write data from and to respective registers. In an embodiment, the registers that data is read from and written to when executing the shader program for the thread groups are arranged in a particular manner, as that will then, as discussed below, help to facilitate the thread group merging operation.

Thus, in some embodiments, the registers that are allocated for use by the shader program (while the shader program is being executed) are divided into two subsets, a set of "common" registers that are physically shared by the thread groups in the set of thread groups that are to be merged into the single thread group, in an embodiment from the start of the execution of the shader program for the thread groups, and a set of "private" registers that are sets of registers that are respectively local (and exclusive) to each thread group in the set and inaccessible to the other thread group or groups in the set of thread groups that are to be merged (i.e. each thread group in the set will have its own set of "private" registers that only it can access).

The division of the registers into "common" and "private" subsets can be done in any suitable and desired manner. In one embodiment, a register index cutoff is used to divide the registers in this way, with all registers below the cutoff being "common" registers and all registers above the cutoff being "private" registers (or vice-versa). The register index cutoff may, e.g., and in an embodiment, be specified by the compiler. Other arrangements for dividing the registers into "common" and "private" subsets may also or instead be used, if desired, such as having a hard coded division of the registers, or a bitmap indicating which registers go into which subset.

In an embodiment, the common and private registers for the thread groups are then used and handled in the following manner.

Firstly, before the thread group merge point in the shader program execution, a thread group can, in an embodiment, freely both read and write for all threads (lanes) of the group to and from the private registers for that thread group (i.e. for both "real" (active) and "helper" (inactive) threads).

Correspondingly, in an embodiment, before the thread group merge point in the shader program execution a thread group can only write to the "common" registers for the set of thread groups for active threads (for lanes containing "real" (active) threads).

Similarly, in an embodiment, before the thread group merge point in the shader program execution, the reading of the common registers by the thread groups is restricted. For example, in an embodiment the thread groups cannot read the common registers at all, or only read the common registers for those lanes containing "real" threads (for the active threads of the thread groups), and/or the thread groups only read actual values in the lanes containing "real" (active) threads, with the lanes that contain "helper" (inactive) threads receiving default values (e.g. all zeros).

This helps to prevent communication between the thread groups before the thread group merge event.

After the thread groups have been merged (the merge event has been performed), in an embodiment the contents of the "private" registers for the thread groups that were merged are invalidated (and thus only the common registers for the thread groups that were merged are considered to have valid values).

The access to the private register space could correspondingly be blocked altogether for the merged, single thread group. However, in an embodiment, a new set of private registers is allocated for the merged, single thread group. This may be done as desired, for example by mapping the private registers of one of the thread groups into the register space of the single, merged thread group, or by, upon the merge event, mapping a fresh set of private registers into the register space for the merged thread group, or by combining the private registers of both of the thread groups to give a larger private register space for the merged, single thread group.

Where the shader program includes multiple thread group merge event points, then the merged private registers may only, and in an embodiment do only, become available after the last merge point.

Corresponding to the above arrangements of common and private registers for the thread groups, in some embodiments, any instruction that requires the use of inactive ("helper") threads is performed before the merge event point in the shader program execution, and in an embodiment uses the private registers for the thread group in question.

Thus, in some embodiments, any instruction that performs a cross-sampling point calculation (such as pixel-delta, mipmap texture lookup) occurs before the thread group merge event point and uses private registers as its inputs, and/or any instruction whose result can potentially be an input into a cross-sampling point calculation occurs before the merge event point and writes its result to private registers.

Correspondingly, in an embodiment, any data item from before the merge event point that needs to be preserved across the thread group merge event (i.e. is to be available for the merged, single thread group after the merge event) is stored in the common register(s) (before the merge event).

This then means that it can be safely assumed that after the thread group merge event, the contents of the private registers of the thread groups are no longer required, such that those private registers can then be invalidated and/or reused as private registers for the merged thread group.

In some embodiments, the shader program operations (code) are organised (configured), e.g. by the compiler that compiles the shader program code, to achieve this.

The above subdivision and handling of registers for the thread groups that are (potentially) to be merged during execution of the shader program facilitates the merging of the thread groups being performed without the need to actually physically move any data between registers for the merge operation.

In the event that it is necessary to spill some of the registers for a thread group to stack (which may occur, e.g., when running fragment shaders with very large data working sets), then again two stacks, one "private" and one "common" in the manner discussed above for the registers could be used. However, this is not necessary, and in another embodiment, in this event a single stack is used but which is invalidated at the merge event. To facilitate this operation, the shader program is, in an embodiment, configured (e.g. by the compiler) such that the stack will be empty at the time of the merge event. (If this cannot be guaranteed at any of the points in the shader program that would otherwise be useful as thread group merge event points, then, in an embodiment, a shader program without any thread group merge event points is generated.)

The above describes an operation where plural thread groups are merged into a single thread group during shader program operation. The Applicants have recognised that the converse operation, namely to "demerge" a single thread group into plural thread groups could also be useful.

For example, there are some graphics processing operations, such as sample frequency shading, in which multiple (e.g. four) sampling points are processed for each sampling position within a render output to be generated. In this case each set of sampling points for a given sampling position can be processed as one thread group (warp) (i.e. such that there will be one thread group for each sampling position of the render output to be processed). However, the Applicants have recognised that in these operations, as well as there being per-sampling point calculations that need to be done, there can be some calculations that need to be done identically for each sampling point for a given sampling position, and so that can, in effect, be done per-sampling position. These per-sampling position calculations would not require a full thread group for each sampling position but rather a single thread group (lane) could perform the calculation for a given sampling position.

This being the case, the Applicants have recognised that, for example, a single thread group (warp) could be used to perform per-sampling position calculations for a set of plural sampling positions, with plural individual thread groups then being used to perform the per-sampling point calculations for the sampling positions. Thus, if the fragment shader program, for example, is or can be configured such that the per-sampling position operations are performed first, it would be possible for the fragment shader execution for a given set of sampling positions to start with a single thread group while the per-sampling position calculations are being performed, with the thread group then being split ("de-merged") into plural thread groups to perform the per-sampling point operations (calculations).

Thus, another embodiment of the technology described herein comprises a method of operating a graphics processing pipeline which includes a programmable shading stage that executes instructions to perform shading operations, in which execution threads may be grouped together into thread groups in which the threads of the group are executed in lockstep, one instruction at a time, the method comprising:

issuing to the shader stage a shader program for execution by the shader stage to process execution threads for generating a render output, together with a thread group divide event indication that indicates a point in the shader program execution where a single thread group is to be divided into plural separate thread groups; and the shading stage:
executing the shader program for a thread group, the executing the shader program for the thread group including:
when the thread group reaches the thread group divide event indication, dividing the single thread group into a plurality of separate thread groups; and
executing further instructions in the shader program after the divide event indication point for the plurality of separate thread groups.

Another embodiment of the technology described herein comprises a data processing system comprising:

a graphics processing pipeline that includes a programmable shading stage that executes instructions to perform shading operations, and in which execution threads may be grouped together into thread groups in which the threads of the group are executed in lockstep, one instruction at a time, and a compiler that compiles programs for the shading stage to generate instructions for execution by the shading stage;
wherein the compiler is configured to:
issue to the shader stage a shader program for execution by the shader stage to process execution threads for generating a render output, together with a thread group divide event indication that indicates a point in the shader program execution where thread groups are to be divided into plural separate thread groups; and the shading stage is configured to:
execute the shader program for thread groups, the executing the shader program for the thread groups including:
when a thread group reaches the thread group divide event indication, dividing the single thread group into a plurality of separate thread groups; and
executing further instructions in the shader program after the divide event indication point for the plurality of separate thread groups.

In these embodiments of the technology described herein, a thread group that is being processed is divided into plural separate thread groups after a certain point in the shader program execution. This then allows, for example, per sampling position calculations that need to be done identically for every sample point for the sampling position to be processed as a single thread group, with the per sampling point calculations then being performed once the single thread group has been divided into the plurality of separate thread groups. This avoids the need, for example, to expend processing resources (such as execution cycles) for calculations for sampling points that are not in fact required.

As will be appreciated by those skilled in the art, these embodiments of the technology described herein can and in some embodiments do include any one or more or all of the optional features of the technology described herein, as appropriate.

Thus, for example, in some embodiments the shader program is a fragment shader program, and, correspondingly, in some embodiments the shader stage is (operating as) a fragment shader stage of the graphics processing pipeline.

Thus, for example, the thread groups can be any suitable and desired size. In an embodiment each initial single thread group contains four threads (i.e. there is a warp width of four). In an embodiment, the thread groups after the divide event contain the same number of threads as the initial single thread group (so, e.g., 4 threads).

Similarly, in some embodiments the thread group divide event indication that is included in the shader program is provided in one of the manners discussed above (thus as or as part of an instruction in the shader program, by means of a modifier of or to an instruction in the shader program, or in some other way that can indicate the thread group divide event point in the shader program, such as a cutoff point specified separately from the shader program code itself).

In an embodiment, the thread group divide event indication is again provided by the compiler (the shader compiler) for the graphics processing pipeline.

In an embodiment, the compiler analyses the shader program code that is provided, e.g. by the application on the host processor that requires the graphics processing, determines whether a thread group divide event at some point in the shader program execution is possible, and if so, then provides the thread group divide event indication at and for the appropriate point in the shader program (e.g. by inserting a specific instruction in the shader program at that point, or otherwise) to indicate the thread group divide event point.

In an embodiment, the compiler is also operable to (where this is possible) re-order operations in the shader program so as to, e.g., provide an opportunity to include a thread group divide event in the shader program execution, and/or so as to allow for the more efficient inclusion and use of a thread group divide event in the execution of the shader program.

In this regard, in an embodiment the compiler operates to place any shader program operations that perform per-sampling position calculations before the thread group divide event indication point. Correspondingly, in an embodiment the compiler places any shader program operations that perform per-sampling point calculations after the thread group divide event point in the shader program execution.

These embodiments of the technology described herein again extend to the compiler operation per se.

Thus, another embodiment of the technology described herein comprises a compiler that compiles programs to generate instructions for a shading stage of a graphics processing pipeline that executes instructions to perform shading operations, and in which execution threads may be grouped together into thread groups in which the threads of the group are executed in lockstep, one instruction at a time;

wherein the compiler is configured to, for a shader program to be executed by a shader stage:

determine whether the shader program includes both operations that must be performed individually for threads to be executed and operations that can be performed collectively for groups of threads to be executed; and when it is determined that the shader program includes both operations that must be performed individually for threads to be executed and operations that can be performed collectively for groups of threads to be executed, include in or provide with the shader program a thread group divide event indication that indicates a point in the shader program execution where a thread group should be divided into plural separate thread groups, the thread group divide point being after the operations that can be performed collectively for groups of threads to be executed in the shader program, and before one or more (and in an embodiment all) of the operations that must be performed individually for threads to be executed in the shader program.

Another embodiment of the technology described herein comprises a method of compiling a program to generate instructions for a shading stage of a graphics processing pipeline that executes instructions to perform shading operations, and in which execution threads may be grouped together into thread groups in which the threads of the group are executed in lockstep, one instruction at a time;

the method comprising, for a shader program to be executed by a shader stage:

determining whether the shader program includes both operations that must be performed individually for threads to be executed and operations that can be performed collectively for groups of threads to be executed; and when it is determined that the shader program includes both operations that must be performed individually for threads to be executed and operations that can be performed collectively for groups of threads to be executed, including in or providing with the shader program a thread group divide event indication that indicates a point in the shader program execution where a thread group should be divided into plural separate thread groups, the thread group divide point being after the operations that can be performed collectively for groups of threads to be executed in the shader program, and before one or more (and in an embodiment all) of the operations that must be performed individually for threads to be executed in the shader program.

These embodiments of the technology described herein correspondingly also extend to a shader stage of a graphics processing pipeline that can divide thread groups in response to a thread group divide indication for a shader program being executed by the shader stage.

Thus, another embodiment of the technology described herein comprises a shader stage of a graphics processing pipeline that executes instructions to perform shading operations, and in which execution threads may be grouped together into thread groups in which the threads of the group are executed in lockstep, one instruction at a time, the shader stage being configured to:

when executing instructions of a shader program, in response to a thread group divide event indication that indicates a point in the shader program execution where thread groups should be divided into plural separate thread groups, associated with the shader program:

divide a thread group into a plurality of separate thread groups; and execute further instructions in the shader program after the divide event indication for the plurality of separate thread groups.

Another embodiment of the technology described herein comprises a method of operating a shader stage of a graphics processing pipeline that executes instructions to perform shading operations, and in which execution threads may be grouped together into thread groups in which the threads of the group are executed in lockstep, one instruction at a time;

the method comprising the shader stage, when executing instructions of a shader program, in response to a thread group divide event indication that indicates a point in the shader program execution where thread groups should be divided into plural separate thread groups, associated with the shader program:

dividing a thread group into a plurality of separate thread groups; and executing further instructions in the shader program after the divide event indication for the plurality of separate thread groups.

As will be appreciated by those skilled in the art, these embodiments of the technology described herein can and in some embodiments do include any one or more or all of the optional features of the technology described herein, as appropriate. Thus, for example, in an embodiment the shader program is a fragment shader program, and, correspondingly, in an embodiment the shader stage is (operating as) a fragment shader stage of the graphics processing pipeline.

In these embodiments and embodiments of the technology described herein, once the thread groups have been issued to the shading stage, the shading stage will execute the shader program for the thread groups. Then, when a (and in an embodiment when each) thread group reaches the thread group divide event indication, the thread group is divided into plural separate thread groups. More than one thread group divide event point (and indication) could be included in a shader program, if desired. In this case, divided thread groups may be divided again when they reach a later divide point in the shader program execution.

The number of thread groups that the initial single thread group is divided into can be selected as desired, and may, e.g., and in an embodiment, depend upon the size of the thread groups that the shader supports and the number of sampling points to be considered for each sampling position.

Thus, for example, and in an embodiment, the initial single thread group could be divided into plural separate thread groups, each representing one of the threads (lanes) from the initial single thread group. This may be appropriate where, for example, each sampling position has a number of sampling points associated with it that corresponds to the number of threads that the thread groups in the shader can contain. In this case the (and in an embodiment each) initial thread group will be divided into as many separate thread groups as there were threads in the initial thread group.

Alternatively or additionally, sampling points from different sampling positions could be processed using the same thread group. For example, the sampling points for a respective sampling point position for each of the sampling positions that the initial single thread group represents could be processed as a respective thread group after the initial single thread group has been divided. In this case, the initial thread group would be divided into plural separate thread groups, each representing, e.g. and in an embodiment, the sampling points from one of the respective sampling point positions for each of the threads (lanes) from the initial single thread group. Thus, in this case, the (and in an embodiment each) initial thread group would be, and in an embodiment is, divided into as many separate thread groups as there are sampling points per sampling position to be processed.

After the thread group divide event, further instructions in the shader program are executed for the divided thread group (the plural separate thread groups). In an embodiment, the execution of the remaining instructions in the shader program after the divide event indication point is completed (appropriately) for the plural separate thread groups.

In come embodiments of the technology described herein, the registers that data is read from and written to when executing the shader program for the thread groups are arranged in a particular manner, as that will again help to facilitate the thread group dividing operation.

Thus, in some embodiments, the registers used during execution of the shader program are again divided into two subsets, a set of "common" registers that are physically shared by the initial single thread group and the thread groups in the set of thread groups that are to be divided from the single thread group, in an embodiment from the start of the execution of the shader program, and a set of "private" registers that are sets of registers that are respectively local (and exclusive) to each thread group and inaccessible to the other thread group or groups (i.e. each thread group (both the initial single thread group and the thread groups in the set of thread groups that the single thread group is divided into) will have its own set of "private" registers that only it can access).

In some of these arrangements, before the thread group divide point in the shader program execution, the initial "single" thread group uses the common registers for the thread group(s) for its calculations (and thus, in an embodiment can freely both read and write for all threads (lanes) of the group to and from the common registers for the thread group(s)).

Then, in some embodiments, after the initial single thread group has been divided (the divide event has been performed), the common registers for the thread group that was divided are treated as a read-only register(s) (so as to preserve the per-sampling position values), and in some embodiments calculations performed after the thread group divide event use (and in an embodiment, only use) the private registers for the thread group in question.

In some embodiments, the shader program operations (code) are organised (configured), in an embodiment by the compiler that compiles the shader program code, to achieve this. Correspondingly, appropriate private and common registers can be reserved for the thread groups before the shader program execution is started.

The above subdivision and handling of registers for the thread groups that are to be divided during execution of the shader program facilitates the dividing of the thread groups being performed without the need to actually physically move any data between registers for the divide operation.

It would be possible, if desired, to include both a thread group merge event opportunity and a thread group divide event in a given shader program. However, the Applicants believe that in most circumstances it will be appropriate to include one or other of these events in a given shader program, but not both.

It will be appreciated from the above, that in both the thread group merge and thread group divide operations of the technology described herein, an important feature is the arrangement of the registers that the threads and thread groups use into "private" and "common" registers. It is believed that such an arrangement of the registers that are used by thread groups when a shader program is being executed may be new and advantageous in its own right.

Thus, a yet further embodiment of the technology described herein comprises a method of allocating registers for use by thread groups when executing instructions to perform processing operations in a graphics processing pipeline which includes programmable shading stages that execute instructions to perform shading operations, and in which execution threads may be grouped together into thread groups in which the threads of the groups are executed in lockstep, one instruction at a time, the method comprising:

providing for use for a thread group for which a shader program is to be executed by a programmable shading stage of the graphics processing pipeline during execution of the shader program, a common register or registers that is to be shared with other thread groups for which the shader program is to be executed, and a private register or registers that is local (exclusive) to the thread group and inaccessible to other thread groups for which the shader program is to be executed.

A yet further embodiment of the technology described herein comprises a graphics processing pipeline comprising:

one or more programmable shading stages that execute instructions to perform shading operations, and in which execution threads may be grouped together into thread groups in which the threads of the groups are executed in lockstep, one instruction at a time; and a plurality of registers for use by thread groups when executing instructions to perform processing operations; wherein:

the plurality of registers are arranged in use so as to provide for use for a thread group for which a shader program is to be executed by a programmable shading stage of the graphics processing pipeline, during execution of the shader program, a common register or registers that is shared with other thread groups for which the shader program is to be executed, and a private register or registers that is local to the thread group and inaccessible to other thread groups for which the shader program is to be executed.

As will be appreciated by those skilled in the art, these embodiments of the technology described herein can and some embodiments do include any one or more or all of the optional features of the technology described herein, as appropriate.

Thus, in an embodiment, for example, the subdivision of the registers into common and private registers is performed in one of the manners discussed above.

Correspondingly, in an embodiment the shader program execution uses the common register or registers for the thread group for certain, e.g. selected, operations, and uses the private register or registers for the thread group for other, e.g. selected, operations.

Similarly, in an embodiment, the use of the common and private registers for shader program operations for the thread group is varied and/or selected based upon the point within the shader program that has been reached.

The fragment shader of the graphics processing pipeline can be implemented as desired and in any suitable manner, and can perform any desired and suitable fragment shading functions, as appropriate. It may, for example, render a primitive or primitives to generate a set of render output values, e.g. representing a frame for display. These output values may then be exported to external memory for storage and use, such as to a frame buffer for a display.

As well as a fragment shader, the programmable processing stage(s) of the graphics processing pipeline may function (operate) as (the graphics processing pipeline may include) other shader stages (shaders), such as a vertex shader, a geometry shader, etc., if and as desired.

Each programmable processing stage (execution unit), of the graphics processing pipeline may comprise any suitable programmable hardware element such as programmable processing circuitry. Each programmable processing stage may be provided as a separate circuit element to other programmable stages of the processing pipeline or the programmable processing stages may share some or all of their programmable processing circuitry (that is then differently programmed to serve as the desired programmable processing stage).

As well as any programmable processing (shader) stages, the graphics processing pipeline may also contain any other suitable and desired processing stages that a graphics processing pipeline may contain such as a rasteriser, an early depth (or an early depth and stencil) tester, a late depth (or depth and stencil) tester, a blender, a tile buffer, a write out unit, etc.

The technology described herein can be used for all forms of output that a graphics processing pipeline may be used to generate, such as frames for display, render-to-texture outputs, etc. In some embodiments, the output, e.g. fragment shaded, data values from the graphics processing are exported to external, e.g. main, memory, for storage and use, such as to a frame buffer for a display.

In some embodiments, the graphics processing pipeline comprises, and/or is in communication with, one or more memories and/or memory devices that store the data described herein, and/or store software for performing the processes described herein. The graphics processing pipeline may also be in communication with a host microprocessor, and/or with a display for displaying images based on the data generated by the graphics processor.

The technology described herein is applicable to any suitable form or configuration of graphics processor. It is particularly applicable to tile-based graphics processors and graphics processing systems. Thus in an embodiment, the graphics processing system and graphics processing pipeline are a tile-based system and pipeline, respectively.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

In an embodiment, the system comprises, and/or is in communication with, one or more memories and/or memory devices that store the data described herein, and/or that store software for performing the processes described herein. The system may also be in communication with the host microprocessor, and/or with a display for displaying images based on the output of the system.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the data processing system and pipeline can otherwise include any one or more or all of the usual functional units, etc., that data processing pipelines include.

It will also be appreciated by those skilled in the art that all of the described embodiments and embodiments of the technology described herein can, and in some embodiments do, include, as appropriate, any one or more or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processing means said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

FIG. 2 shows a typical computer graphics processing system.

An application 2, such as a game, executing on a host processor 1 will require graphics processing operations to be performed by an associated graphics processing unit (graphics processing pipeline) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 3 shows the graphics processing pipeline 3 of the present embodiment in more detail.

The graphics processing pipeline 3 shown in FIG. 3 is a tile-based renderer and will thus, as is known in the art, produce tiles of a render output data array, such as an output frame to be generated.

(In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may, as is known in the art, typically be an output frame intended for display on a display device, such as a screen or printer, but may also, for example, comprise intermediate data intended for use in later rendering passes (also known as a "render to texture" output), etc.

(When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.)

FIG. 3 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 3. It should also be noted here that FIG. 3 is only schematic, and that, for example, in practice the shown functional units and pipeline stages may share significant hardware circuits, even though they are shown schematically as separate stages in FIG. 3. It will also be appreciated that each of the stages, elements and units, etc., of the graphics processing pipeline as shown in FIG. 3 may be implemented as desired and will accordingly comprise, e.g., appropriate circuitry and/or processing logic, etc., for performing the necessary operation and functions.

As shown in FIG. 3, the graphics processing pipeline 3 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 3. The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 3.

The rasterisation stage 25 of the graphics processing pipeline 3 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. (The tile buffer stores colour and depth buffers that store an appropriate colour, etc., or Z-value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). (The display device could comprise, e.g., a display comprising an array of pixels, such as a computer monitor or a printer.)

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 would, of course, be possible.

The above describes certain features of the operation of the graphics processing system shown in FIG. 2. Further features of the operation of the graphics processing system shown in FIG. 1 in accordance with embodiments of the technology described herein will now be described.

As can be seen from FIG. 3, the graphics processing pipeline 3 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application.

To do this, the application 2 provides the shader programs implemented using a high-level shader programming language, such as GLSL, HLSL, OpenCL, etc. These shader programs are then translated by a shader language compiler to binary code for the target graphics processing pipeline 3. This may include, as is known in the art, the creation of one or more intermediate representations of the program within the compiler. (The compiler may, e.g., be part of the driver 4, with there being a special API call to cause the compiler to run. The compiler execution can thus be seen as being part of the draw call preparation done by the driver in response to API calls generated by an application. The driver will then issue the compiled program(s) to the graphics processing pipeline 3 for execution by the programmable processing stage(s) of the graphics processing pipeline.)

Figure 4:
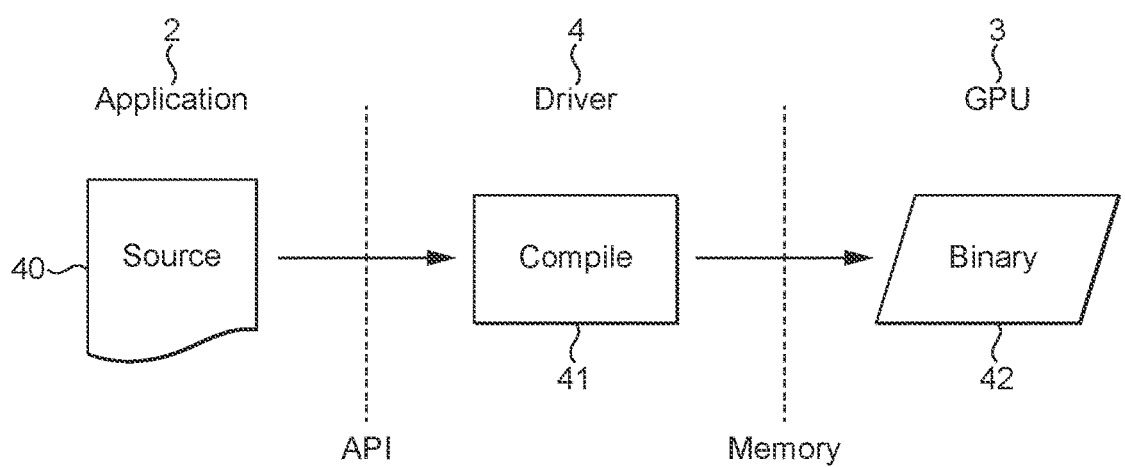
FIG. 4 shows schematically the compiling of a shader program for execution by a graphics processing pipeline.

FIG. 4 illustrates this, and shows the shader program being provided in the high level shader programming language 40 by the application 2 to the driver 4, which then compiles 41 the shader program to the binary code 42 for the graphics processing pipeline 3.

As discussed above, each shader in the graphics processing pipeline is a processing unit that performs graphics processing by running small programs for each graphics item in a graphics output to be generated (an "item" in this regard is usually a vertex, a fragment or a pixel). The present embodiments relate to the situation where execution threads to be executed by a shader (where each thread corresponds to one graphics item) have been organised into a "group" or "bundle" of threads that are to be run in lockstep, one instruction at a time.

Embodiments of the technology described herein will now be described with reference in particular to operations of the fragment shader 27 of the graphics processing pipeline.

In the fragment shader 27, the fragment shading program that is being executed is run once for each sampling position (or point) that is to be processed, with one execution thread being spawned for each sampling position. Typically, the sampling positions (and thus accordingly their corresponding execution threads) are organised into and processed as groups of plural sampling positions (and thus threads). In the present embodiments, the sampling positions are organised into 2×2 "quads", and are correspondingly processed in the fragment shader as thread groups containing four threads, each corresponding to one of the sampling positions of the "quad". The group of threads representing a given sampling position quad is then run in lockstep, one instruction at a time, through the fragment shader.

Figure 5:
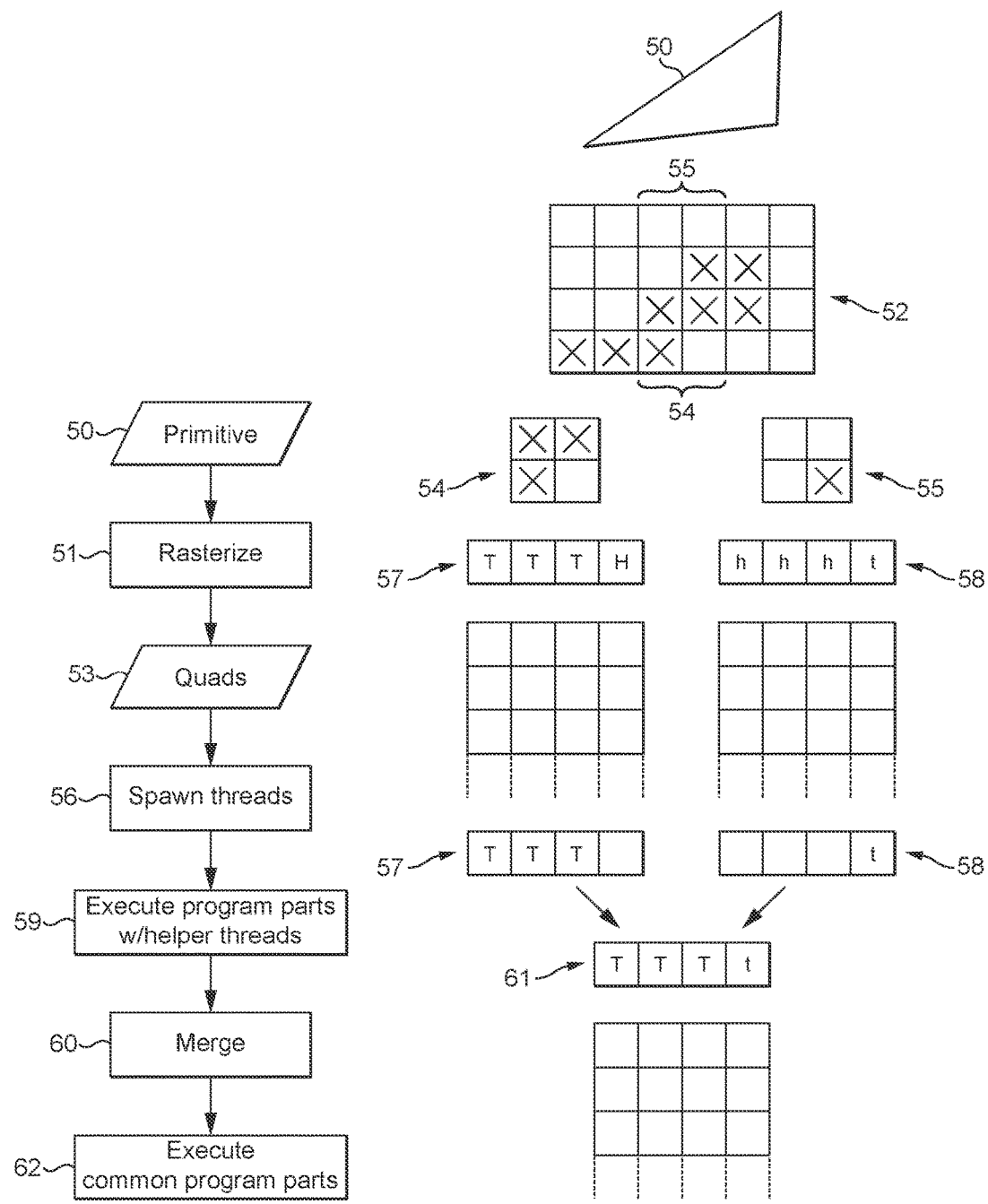
FIG. 5 shows schematically a first embodiment of the technology described herein.

FIG. 5 shows a first embodiment of the technology described herein in which thread groups being executed by the fragment shader 27 are merged during execution of the fragment shader program. This has the effect that threads that do not need to be executed for parts of the fragment shader program do not unnecessarily occupy execution lanes and cycles.

As shown in FIG. 5, a (and each) primitive 50 to be rendered is rasterised 51 (by testing the primitive 50 against the array of sampling points 52 that represents the render output) to generate appropriate fragments 53 corresponding to respective 2×2 sampling position "quads".

The rasteriser 51 also operates to identify pairs of fragments for the primitive for which not all the sampling positions in the fragments are covered by the primitive 50 (and thus for which not all the threads in the corresponding thread group in the fragment shader will be active).

In the present embodiment, the rasteriser identifies pairs of fragments having non-overlapping covered sampling positions (i.e. that will result in thread groups having non-overlapping active threads (i.e. for which the active threads will reside in different thread group (warp) lanes). (However, it would be possible to identify sets of three or more fragments (thread groups (warps)) that may be merged, if desired.)

The rasteriser could also be configured to be able to re-map the allocation of sampling positions to thread group lanes for thread groups (e.g. by flipping the 2×2 quad that the thread group corresponds to horizontally or vertically), so as to (try to) remove the overlap for fragments (thread groups) that in their initial configuration have overlapping covered sampling positions (active threads) (lanes), to allow such thread groups then to be (potentially) merged, if desired.

The rasteriser then signals to the fragment shader the identified fragment pairs (thread groups) that can be merged together, as it issues the fragments to the fragment shader, so that the fragment shader can identify the thread groups that have been identified (associated) as "merge" candidates when they reach the thread group merge event point in the shader program execution.

(If a fragment to be issued to the fragment shader is identified by the rasteriser as being unable to be (potentially) merged with another fragment, then the fragment is indicated as being unable to be merged (as to be processed as a single thread group).)

FIG. 5 shows two exemplary "mergeable" fragments 54, 55 corresponding to respective sampling position quads. It can be seen that for both of the fragments (quads) 54, 55, not all of the sampling positions are covered by the primitive 50 (thus the fragments are "sparse"), and that the covered sampling positions for the fragments do not overlap.

When the fragments 54, 55 reach the fragment shader 27, corresponding execution threads are spawned 56 for execution by the fragment shader 27 to process the fragments 54, 55. As shown in FIG. 5, in the case of the fragment 54, a thread group 57 comprising three active ("real") threads and one inactive, "helper" thread is spawned. Correspondingly, for the fragment 55, a thread group 58 containing three helper threads and one active thread is spawned.

The fragment shading stage then executes the fragment shader program for the thread groups.

First, a first part of the fragment shader program that uses the helper threads of the thread groups 57, 58 is executed 59. This part of the fragment shader program performs fragment shader program operations that require results for the inactive (helper) threads in the thread groups, such as texture lookups.

There is then a merge instruction 60 in the fragment shader program which operates to cause the active threads of the thread groups 57, 58 to be merged into a single, combined thread group 61.

To do this, when the first thread group of the pair of thread groups 57, 58 that are to be merged reaches the thread group merge instruction in the shader program execution, shader program execution for that thread group is stalled until the other thread group that it is to be merged with has also reached the thread group merge instruction in the shader program execution. Then, the thread groups 57, 58 are merged into a single thread group 61 containing the active threads from each of the thread groups 57, 58.

The thread groups 57, 58 are merged into the single thread group 61 containing the active threads from each of the thread groups by mapping the active threads from each thread group to respective lanes of the merged, single thread group 61. The merged thread groups then proceed as one shared thread group 61, having a single (active) program counter.

Following this thread group merger, the remaining program steps of the fragment shader program are executed 62 for the merged thread group 61. This part of the fragment shader program executes operations, such as arithmetic operations, that do not need to be executed for inactive (helper) threads of the thread group.

(If an "unmergeable" thread group reaches the thread group merge instruction in the shader program execution, the thread group merge event instruction is ignored (has no effect), and the fragment shader program is simply continued to be executed for the thread group on its own.)

This is repeated for each fragment that is issued by the rasteriser 51.

Figure 6A:
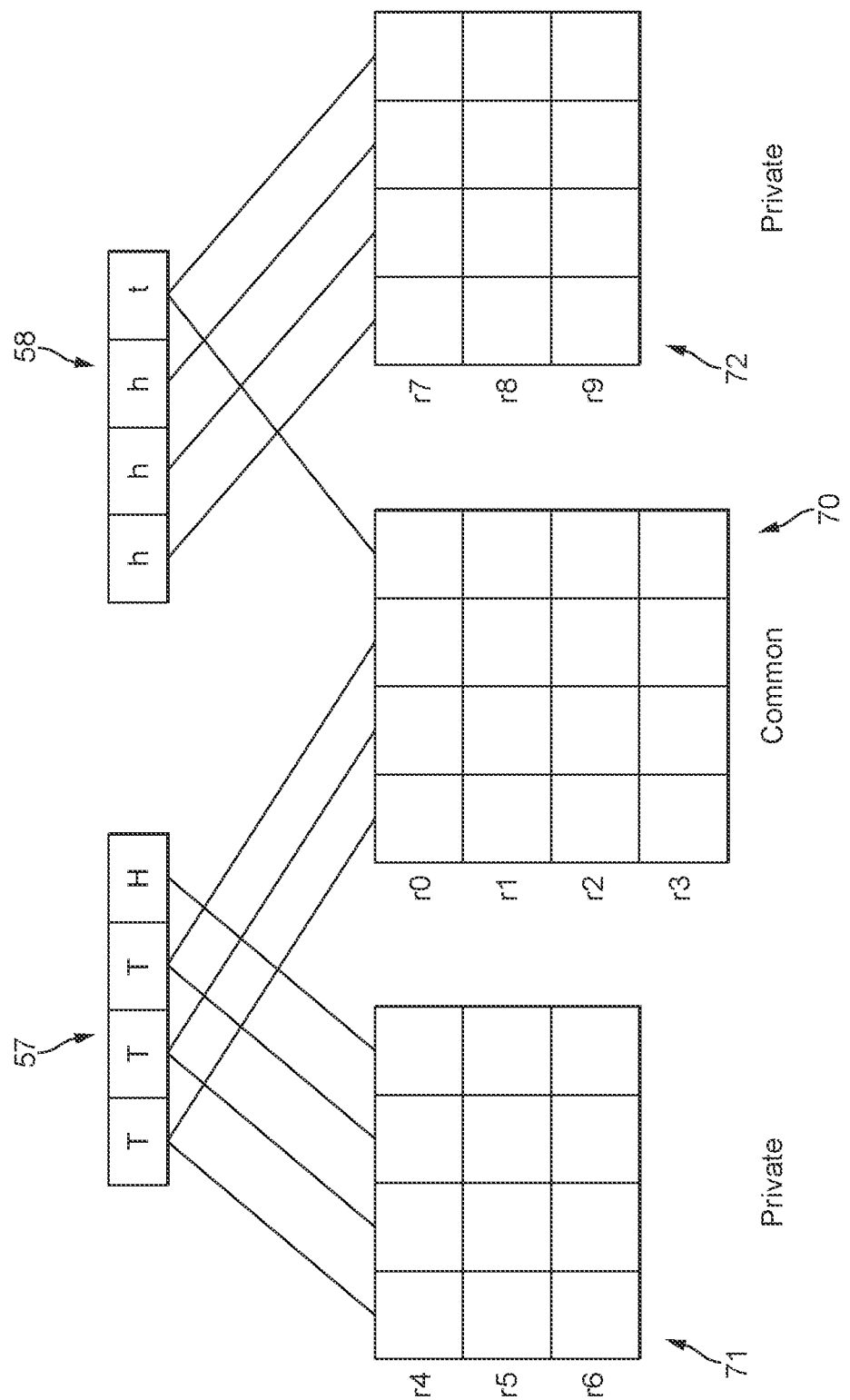
FIGS. 6A and 6B show schematically the use of registers in the first embodiment of the technology described herein.
Figure 6B:
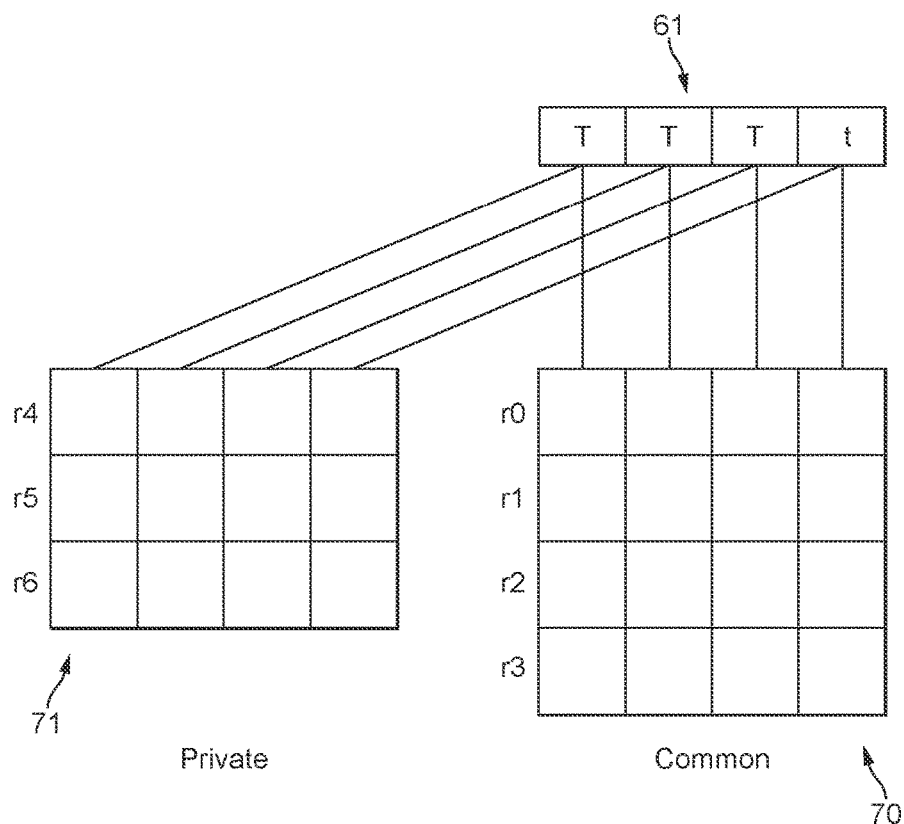

FIG. 5 shows the execution of the fragment shader program. In order to facilitate the operation shown in FIG. 5, the registers that the fragment shader program reads and writes data from and to are arranged as shown in FIGS. 6A and 6B to facilitate the merging of the thread groups as shown in FIG. 5. FIG. 6A shows the register arrangement before the thread groups are merged, and FIG. 6B shows the register arrangement after the thread groups are merged.

As shown in FIGS. 6A and 6B, the registers used by the fragment shader program are divided into two subsets, a set 70 of "common" registers that are physically shared by the thread groups in the pair of thread groups that are to be merged into the single thread group, and respective sets 71, 72 of "private" registers that are respectively exclusive to each thread group in the pair and inaccessible to the other thread group in the pair of thread groups that are to be merged.

In the present embodiment, the division of the registers into "common" and "private" subsets is done using a register index cutoff, with all registers below the cutoff being "common" registers and all registers above the cutoff being "private" registers. The register index cutoff is specified by the compiler. Other arrangements for dividing the registers into "common" and "private" subsets may also or instead be used, if desired, such as having a hard coded division of the registers, or a bitmap indicating which registers go into which subset.

The common and private registers for the thread groups are used and handled in the following manner.

Firstly, before the thread group merge instruction 60 in the shader program execution, a thread group can freely both read and write for all threads (lanes) of the group to and from the private registers for that thread group (i.e. for both "real" (active) and "helper" (inactive) threads).

Correspondingly, before the thread group merge instruction in the shader program execution, a thread group can only write to the "common" registers for the set of thread groups for its active threads (for lanes containing "real" (active) threads), and the thread groups can only read the common registers for their lanes that contain "real" threads (for the active threads of the thread groups).

After the thread groups have been merged (the merge instruction has been performed), the contents of the "private" registers for the thread groups that were merged are invalidated (and thus only the common registers for the thread groups that were merged are considered to have valid values), and a new set of private registers is allocated for the merged, single thread group (as shown in FIG. 6B). In the present embodiment the latter is done by mapping the private registers 71 of one of the thread groups 57 into the register space of the single, merged thread group 61, but other arrangements would be possible, if desired.

When executing the fragment shader program for the thread groups 57, 58, any operation that requires the use of inactive ("helper") threads is performed before the merge event point in the shader program execution, and uses the private registers for the thread group in question.

Correspondingly, any data item from before the merge event point that needs to be preserved across the thread group merge event (i.e. that needs to be available for the merged, single thread group after the merge event) is stored in the common register(s) (before the merge event).

Figure 7:
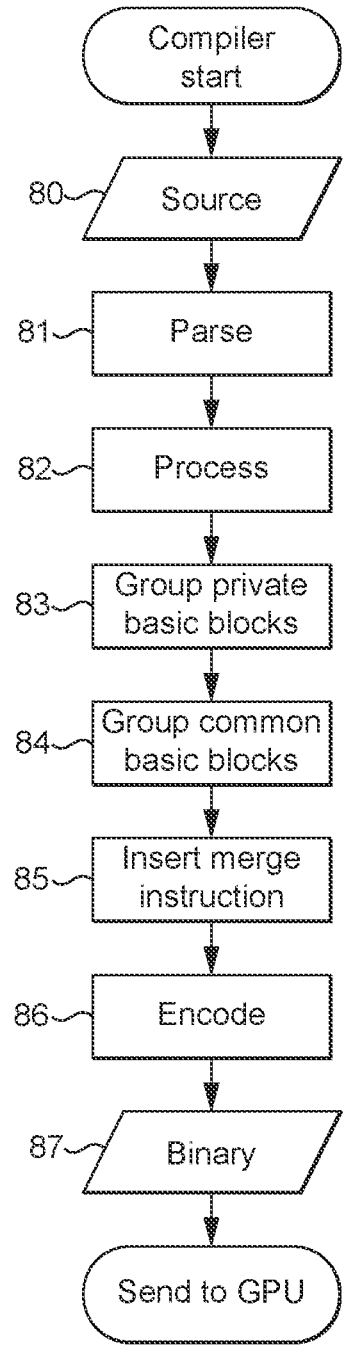
FIG. 7 shows schematically the operation of the compiler in the first embodiment of the technology described herein.

The fragment shader program operations (code) are configured by the compiler that compiles the fragment shader program code to achieve this. The compiler also includes the merge instruction 60 at the appropriate point in the fragment shader program when it compiles the fragment shader program. FIG. 7 illustrates the operation of the compiler in this regard.

As shown in FIG. 7, the compiler receives the fragment shader program in the high level source language 80, and parses 81 and processes 82 that program. It then identifies the program operations that use the inactive (helper) threads 83 and the program operations that only require active threads 84, and groups those operations appropriately in the compiled fragment shader program (with the program operations that use the inactive (helper) threads being before the program operations that only require active threads).

The compiler then inserts 85 the thread group merge instruction at the appropriate point in the fragment shader program (i.e. after all the operations that require the use of inactive (helper threads) in the fragment shader program and before those program operations that only require active threads).

The so-arranged fragment shader program is then encoded 86 into the appropriate binary code 87 for the graphics processing pipeline and sent to the graphics processing pipeline for execution.

In this embodiment the thread group merge event is provided in the fragment shader program as or as part of an instruction in the fragment shader program. However, other arrangements would be possible, such as indicating the thread group merge event by means of a modifier of or to an instruction in the fragment shader program, or in some other way, such as a cutoff point specified separately from the fragment shader program code itself.

Figure 8:
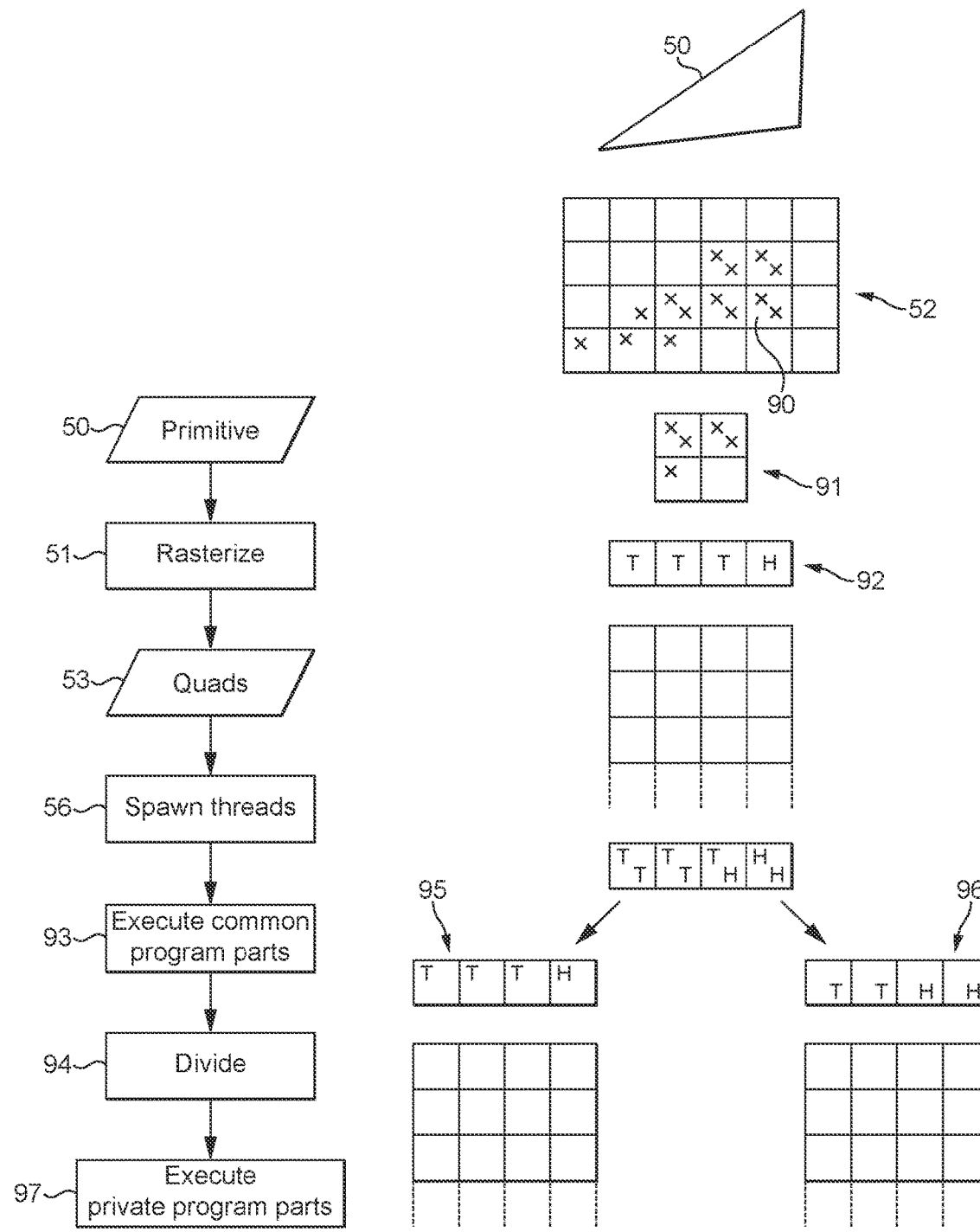
FIG. 8 shows schematically a second embodiment of the technology described herein.
Figure 9A:
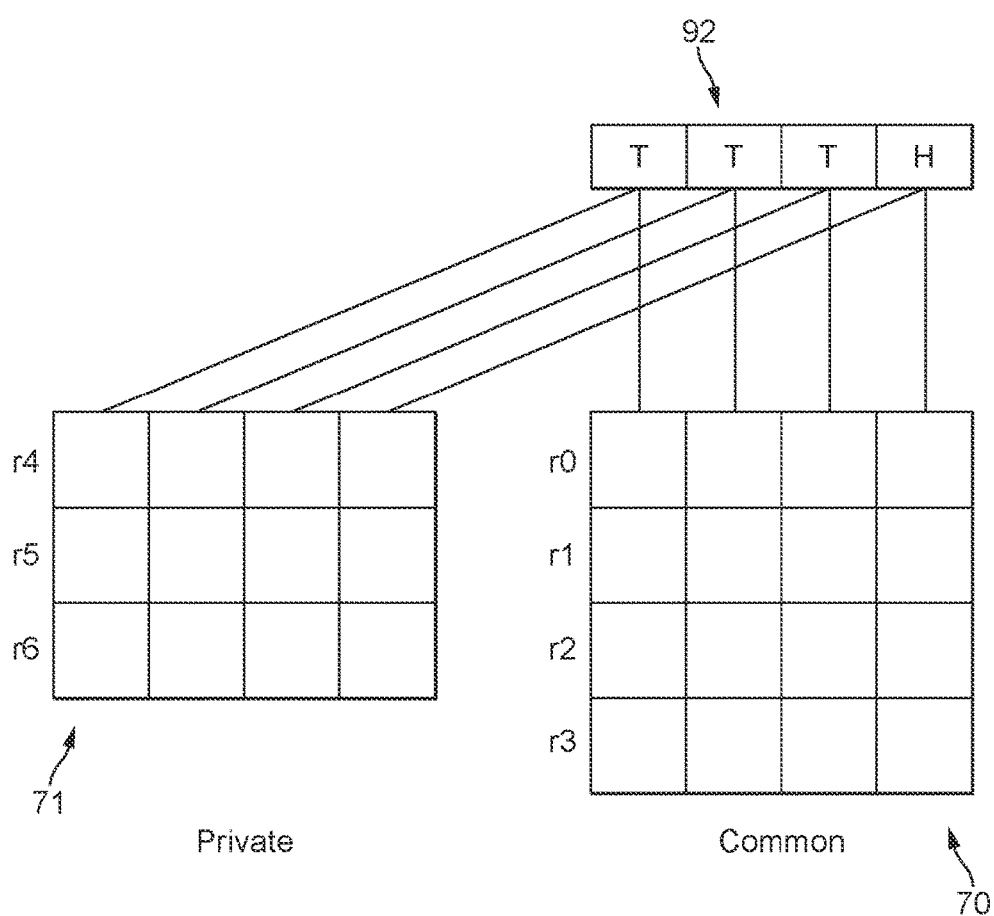
FIGS. 9A and 9B show schematically the use of registers in the second embodiment of the technology described herein.
Figure 9B:
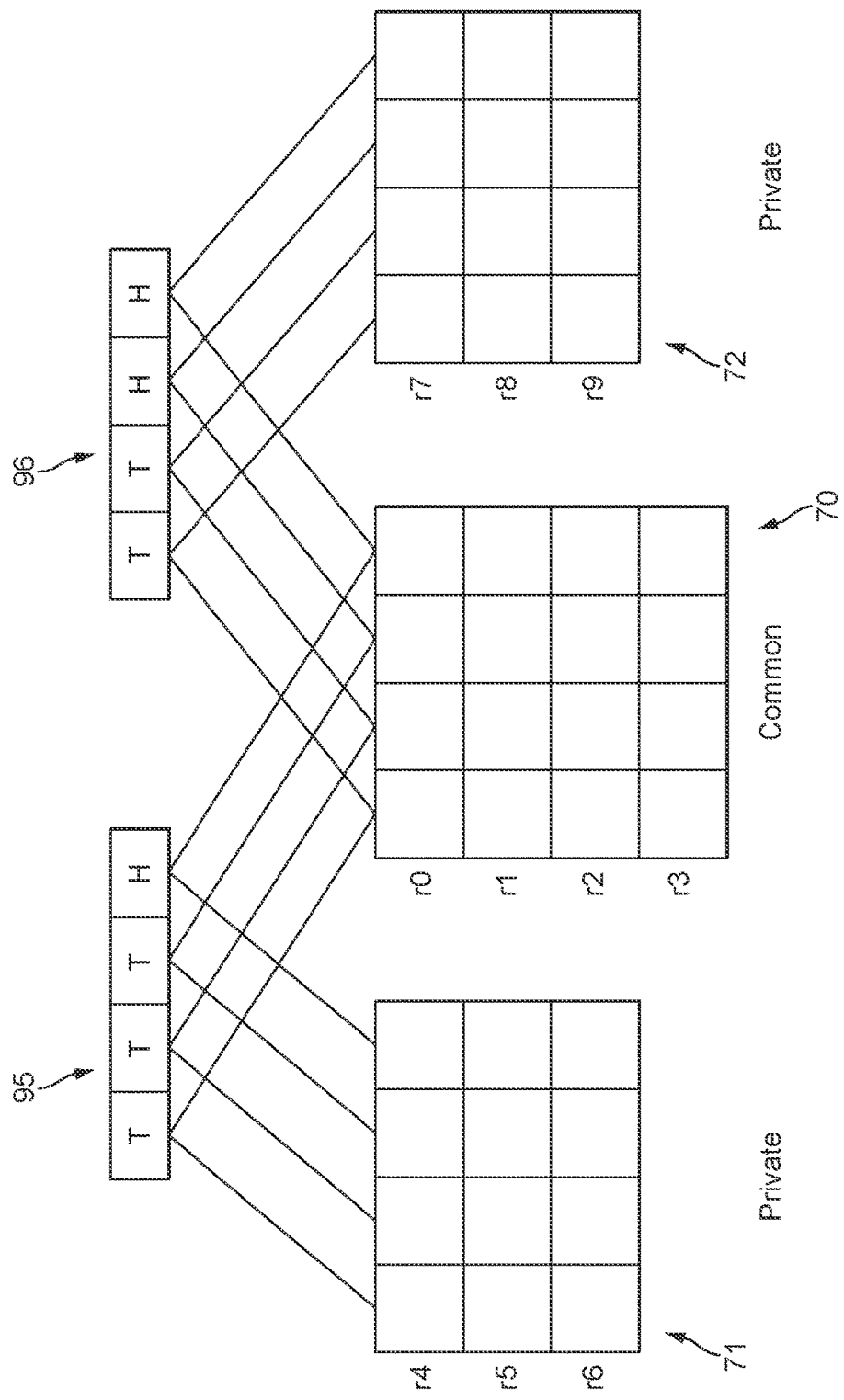
Figure 10:
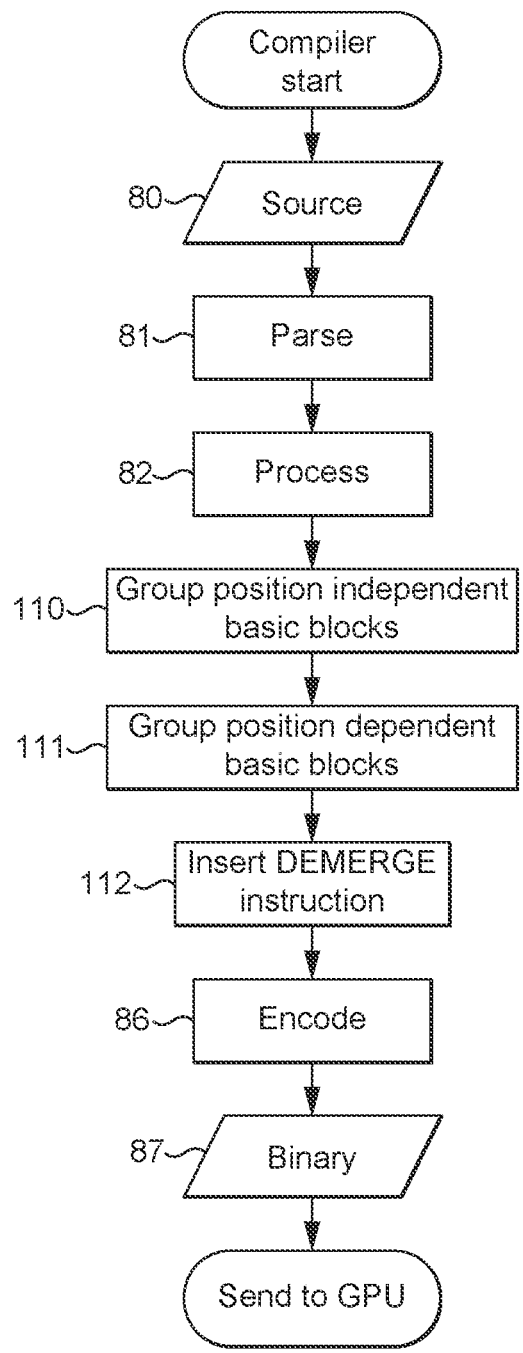
FIG. 10 shows schematically the operation of the compiler in the second embodiment of the technology described herein.

FIGS. 8 to 10 show a second embodiment of the technology described herein, in which thread groups are divided (demerged) into plural separate thread groups during fragment shader program execution.

This can be useful in graphics processing operations such as sample frequency shading, in which multiple (e.g. four) sampling points are processed for each sampling position within a render output to be generated, but as well as there being per-sampling point calculations that need to be done, there can be some calculations that need to be done identically for each sampling point for a given sampling position.

FIG. 8 shows schematically the operation in this second embodiment of the technology described herein in which thread groups being executed by the fragment shader 27 are divided (demerged) during execution of the fragment shader program.

As shown in FIG. 8, a (and each) primitive 50 to be rendered is again rasterised 51 (by testing the primitive 50 against the array of sampling points 52 that represents the render output) to generate appropriate fragments 53 corresponding to respective 2×2 sampling position "quads".

However, as shown in FIG. 8, in this case, each sampling position of the render output has two sampling points 90 associated with it (to be processed for it by the fragment shader).

The rasteriser identifies those sampling positions of the array 52, and the respective sampling points for each sampling position, that are covered by the primitive 50, and generates a fragment for each 2×2 sampling position quad that includes a covered sampling point.

FIG. 8 shows an exemplary fragment 91 corresponding to a partially covered sampling position quad.

When the fragment 91 reaches the fragment shader 27, corresponding execution threads are spawned 56 for execution by the fragment shader 27 to process the sampling positions that the fragment 91 represents. As shown in FIG. 8, in the case of the fragment 91, a thread group 92 comprising three active ("real") threads and one inactive, "helper" thread, corresponding to the sampling positions that the fragment 91 represents, is spawned.

The fragment shading stage then executes the fragment shader program for the thread group 92.

First, a first part of the fragment shader program that performs per-sampling position calculations (i.e. calculations that are not dependent upon the position (point) within the render output area represented by the sampling position) is executed 93.

There is then a divide instruction 94 in the fragment shader program which operates to divide the thread group 92 into two separate thread groups 95, 96, each representing one set of the sampling points for the sampling positions that the fragment 91 (and thus the thread group 92) represents.

Following this thread group division, the remaining program steps of the fragment shader program are executed 97 for both the thread groups 95, 96. This part of the fragment shader program executes operations that perform per-sampling point calculations (i.e. calculations that are dependent upon the position (point) within the render output area represented by the sampling position being considered).

This is repeated for each fragment that is issued by the rasteriser 51.

It should be noted in this regard that although the thread groups 92, 95 and 96 shown in FIG. 8 contain both active and inactive threads (in accordance with which sampling positions and corresponding sampling points of the quad are covered by the primitive 50), it can be the case (and indeed may commonly be the case) in this embodiment that each thread group (i.e. both the initial, single thread group, and the plural separate thread groups after the thread group divide event) will completely contain active threads (i.e. all the thread group (warp) lanes will be active at all times).

FIG. 8 shows the execution of the fragment shader program in this embodiment. In order to facilitate the operation shown in FIG. 8, the registers that the fragment shader program reads and writes data from and to are arranged as shown in FIGS. 9A and 9B to facilitate the dividing of the thread groups as shown in FIG. 8. FIG. 9A shows the register arrangement before a thread group is divided, and FIG. 9B shows the register arrangement after a thread group has been divided.

As shown in FIGS. 9A and 9B, the registers used by the fragment shader program are again divided into two subsets, a set 70 of "common" registers that are physically shared by the thread groups (both before and after the thread group is divided), and respective sets 71, 72 of "private" registers that are respectively exclusive to each thread group and inaccessible to the other thread group in the pair of divided thread groups. These registers are allocated (reserved) for use by the thread groups at the start of the shader program execution.

In this embodiment, before the thread group divide point 94 in the shader program execution, the initial "single" thread group 92 uses the common registers 70 for the thread groups for its per-sampling position calculations (and thus can freely both read and write for all threads (lanes) of the group to and from the common registers for the thread groups).

Then, after the initial single thread group 92 has been divided (the divide event 94 has been performed), the common registers 70 for the thread groups are treated as a read-only register(s) (so as to preserve the calculated per-sampling position values), and calculations performed after the thread group divide event 94 use the private registers 71, 72 for the thread group 95, 96 in question.

The fragment shader program operations (code) are again configured by the compiler that compiles the fragment shader program code to achieve this. The compiler also includes the divide instruction 94 at the appropriate point in the fragment shader program when it compiles the fragment shader program. FIG. 10 illustrates the operation of the compiler in this regard.

As shown in FIG. 10, the compiler receives the fragment shader program in the high level source language 80, and parses 81 and processes 82 that program. It then determines whether a thread group divide event at some point in the fragment shader program execution is possible, and if so, then identifies the program operations that are "per-sampling position" 110 and the program operations that are "per-sampling point" (within a sampling position) 111, and groups those operations appropriately in the compiled fragment shader program (with the program operations that are "per-sampling position" 110 being placed before the program operations that are "per-sampling point" (within a sampling position) 111).

The compiler then inserts 112 the thread group divide instruction at the appropriate point in the fragment shader program (i.e. after all the operations that are "per-sampling position" 110 and before the program operations that are "per-sampling point" (within a sampling position) 111).

The so-arranged fragment shader program is then encoded 86 into the appropriate binary code 87 for the graphics processing pipeline and sent to the graphics processing pipeline for execution.

In this embodiment the thread group divide event is again provided in the fragment shader program as or as part of an instruction in the fragment shader program. However, other arrangements would again be possible, such as indicating the thread group divide event by means of a modifier of or to an instruction in the fragment shader program, or in some other way, such as a cutoff point specified separately from the fragment shader program code itself.

It would also be possible to combine the above two embodiments, where appropriate, i.e. to have a fragment shader program that includes both merge and divide points during its execution, where the operations that the fragment shader program is to perform facilitate that.

It can be seen from the above that the technology described herein, in its embodiments at least, provides more efficient mechanisms for executing shader programs in graphics processing systems. This is achieved, in the embodiments of the technology described herein at least, by identifying and including opportunities to merge and/or divide thread groups that are executing a shader program to facilitate more efficient execution of the shader program.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing pipeline which includes a programmable shading stage that executes instructions to perform shading operations, in which execution threads may be grouped together into thread groups in which the threads of the group are executed in lockstep, one instruction at a time, the method comprising:

issuing to the shader stage a shader program for execution by the shader stage to process execution threads for generating a render output, together with a thread group merge event indication that indicates a point in the shader program execution where thread groups for which not all the threads in the thread group are active may be merged;

the graphics processing pipeline:

identifying a set of two or more thread groups to be processed by the shading stage for which not all the threads in the thread groups are active and which may be merged into a single thread group; and the shading stage:
executing the shader program for the identified thread groups, the executing the shader program for the identified thread groups including:
when the identified thread groups have reached the thread group merge event indication, merging the thread groups into a single thread group containing the active threads from each of the thread groups; and
executing further instructions in the shader program after the merge event indication point for the merged thread group;
the method further comprising:
providing for a set of two or more thread groups that are to be merged into a single thread group when executing the shader program, for use during execution of the shader program for the thread groups, a set of common registers that are physically shared by the thread groups in the set of two or more thread groups that are to be merged into the single thread group, and a set of private registers that are sets of registers that are respectively exclusive to each thread group in the set of two or more thread groups that are to be merged and inaccessible to the other thread group or groups in the set of two or more thread groups that are to be merged; and
storing any data item from before the thread group merge event point that needs to be preserved across the thread group merge event in the common registers for the set of two or more thread groups.

2. The method of claim 1, comprising the shader compiler for the graphics processing pipeline, for a shader program to be executed by a shader stage:
determining whether there is a point within the execution of the shader program where two or more thread groups each having inactive threads may be merged; and
when it is determined that there is a point in the shader program execution where two or more thread groups having inactive threads may be merged, including in or providing with the shader program, a thread group merge event indication that indicates a point in the shader program execution where two or more thread groups, each having inactive threads, may be merged.

3. The method of claim 2, further comprising:
the compiler placing any shader program operations that require results for inactive threads before the thread group merge event point, and placing any shader program operations that do not need to be executed for inactive threads in a thread group after the thread group merge event point, in the shader program execution.

4. The method of claim 1, wherein thread groups that will have non-overlapping active threads are identified as being thread groups that can be merged into a single thread group.

5. The method of claim 1, further comprising:
re-mapping the allocation of sampling positions to thread group lanes for thread groups, so as to allow thread groups then to be merged.

6. The method of claim 1, further comprising: the thread groups, before the thread group merge point in the shader program execution, writing to the common registers for the set of thread groups only for their respective active threads.

7. The method of claim 6, further comprising: performing any shader program operation that requires the use of inactive threads before the merge event point in the shader program execution, and using the private registers for the thread group in question.

8. A method of compiling a program to generate instructions for a shading stage of a graphics processing pipeline that executes instructions to perform shading operations, and in which execution threads may be grouped together into thread groups in which the threads of the group are executed in lockstep, one instruction at a time;
the method comprising, for a shader program to be executed by a shader stage:
determining whether there is a point within the execution of the shader program where two or more thread groups each having inactive threads may be merged; and
when it is determined that there is a point in the shader program execution where two or more thread groups having inactive threads may be merged, including in or providing with the shader program, a thread group merge event indication that indicates a point in the shader program execution where two or more thread groups, each having inactive threads, may be merged;
and further comprising:
including in or providing with the shader program an indication, for a set of two or more thread groups that are to be merged into a single thread group when executing the shader program, of a set of common registers that are physically shared by the thread groups in the set of two or more thread groups that are to be merged into the single thread group, and a set of private registers that are sets of registers that are respectively exclusive to each thread group in the set of two or more thread groups and inaccessible to the other thread group or groups in the set of two or more thread groups that are to be merged, for use during execution of the shader program for the thread groups; and
including in the shader program, one or more instructions to cause a set of two or more thread groups that are to be merged into a single thread group when executing the shader program, to store any data item from before the thread group merge event point that needs to be preserved across the thread group merge event in the set of common registers indicated for the set of two or more thread groups.

9. A data processing system comprising:
a graphics processor that includes programmable shading stage circuitry that executes instructions to perform shading operations, and for which execution threads may be grouped together into thread groups in which the threads of the group are executed in lockstep, one instruction at a time, and
processing circuitry configured to compile programs for the shading stage circuitry to generate instructions for execution by the shading stage circuitry;
the compiler processing circuitry is configured to:
issue to the shader stage circuitry a shader program for execution by the shader stage circuitry to process execution threads for generating a render output, together with a thread group merge event indication that indicates a point in the shader program execution where thread groups for which not all the threads in the thread group are active may be merged;
the graphics processor further including:
processing circuitry configured to
identify respective sets of two or more thread groups to be processed by the shading stage circuitry for which not all the threads in the thread groups are active and which may be merged into a respective single thread group; and
for a set of two or more thread groups that are to be merged into a single thread group when executing a shader program, for use during execution of the shader program for the thread groups, a set of common registers that are physically shared by the thread groups in the set of two or more thread groups that are to be merged into the single thread group, and a set of private registers that are sets of registers that are respectively exclusive to each thread group in the set of two or more thread groups and inaccessible to the other thread group or groups in the set of two or more thread groups that are to be merged;

the shading stage circuitry is configured to:

execute the shader program for the identified thread groups, the executing the shader program for the identified thread groups including:

when thread groups of a respective identified set of mergeable thread groups have reached the thread group merge event indication, merging the thread groups into a single thread group containing the active threads from each of the thread groups;

storing any data item from before the thread group merge event point that needs to be preserved across the thread group merge event in the common registers for the identified set of mergeable thread groups; and executing further instructions in the shader program after the merge event indication point for the merged thread group.

10. The system of claim 9, wherein the compiler processing circuitry is configured to:

determine whether there is a point within the execution of a shader program where two or more thread groups each having inactive threads may be merged; and when it is determined that there is a point in a shader program execution where two or more thread groups having inactive threads may be merged, include in or provide with the shader program, a thread group merge event indication that indicates a point in the shader program execution where two or more thread groups, each having inactive threads, may be merged.

11. The system of claim 9, wherein the compiler processing circuitry is configured to:

place any shader program operations that require results for inactive threads before the thread group merge event point, and place any shader program operations that do not need to be executed for inactive threads in a thread group after the thread group merge event point, in the shader program execution.

12. The system of claim 9, wherein thread groups that will have non-overlapping active threads are identified as being thread groups that can be merged into a single thread group.

13. The system of claim 9, wherein the graphics processor comprises processing circuitry operable to:

re-map the allocation of sampling positions to thread group lanes for thread groups, so as to allow thread groups then to be merged.

14. The system of claim 9, wherein the shading stage circuitry is configured to: for the thread groups, before the thread group merge point in the shader program execution, write to the common registers for the set of thread groups only for their respective active threads.

15. The system of claim 9, wherein the shading stage circuitry is configured to: perform any shader program operation that requires the use of inactive threads before the merge event point in the shader program execution, and use the private registers for the thread group in question.

16. A non-transitory computer readable storage medium storing computer software code which when executing on at least one processor performs a method of compiling a program to generate instructions for a shading stage of a graphics processing pipeline that executes instructions to perform shading operations, and in which execution threads may be grouped together into thread groups in which the threads of the group are executed in lockstep, one instruction at a time;

the method comprising, for a shader program to be executed by a shader stage:

determining whether there is a point within the execution of the shader program where two or more thread groups each having inactive threads may be merged; and when it is determined that there is a point in the shader program execution where two or more thread groups having inactive threads may be merged, including in or providing with the shader program, a thread group merge event indication that indicates a point in the shader program execution where two or more thread groups, each having inactive threads, may be merged;

and further comprising:

including in or providing with the shader program an indication, for a set of two or more thread groups that are to be merged into a single thread group when executing the shader program, of a set of common registers that are physically shared by the thread groups in the set of two or more thread groups that are to be merged into the single thread group, and a set of private registers that are sets of registers that are respectively exclusive to each thread group in the set of two or more thread groups and inaccessible to the other thread group or groups in the set of two or more thread groups that are to be merged, for use during execution of the shader program for the thread groups; and including in the shader program, one or more instructions to cause a set of two or more thread groups that are to be merged into a single thread group when executing the shader program, to store any data item from before the thread group merge event point that needs to be preserved across the thread group merge event in the set of common registers indicated for the set of two or more thread groups.

17. A non-transitory computer readable storage medium storing computer software code which when executing on at least one processor performs a method of operating a graphics processing pipeline which includes a programmable shading stage that executes instructions to perform shading operations, in which execution threads may be grouped together into thread groups in which the threads of the group are executed in lockstep, one instruction at a time, the method comprising:

issuing to the shader stage a shader program for execution by the shader stage to process execution threads for generating a render output, together with a thread group merge event indication that indicates a point in the shader program execution where thread groups for which not all the threads in the thread group are active may be merged;

the graphics processing pipeline:

identifying a set of two or more thread groups to be processed by the shading stage for which not all the threads in the thread groups are active and which may be merged into a single thread group; and the shading stage:

executing the shader program for the identified thread groups, the executing the shader program for the identified thread groups including:

when the identified thread groups have reached the thread group merge event indication, merging the thread groups into a single thread group containing the active threads from each of the thread groups; and executing further instructions in the shader program after the merge event indication point for the merged thread group;

the method further comprising:

providing for a set of two or more thread groups that are to be merged into a single thread group when executing the shader program, for use during execution of the shader program for the thread groups, a set of common registers that are physically shared by the thread groups in the set of two or more thread groups that are to be merged into the single thread group, and a set of private registers that are sets of registers that are respectively exclusive to each thread group in the set of two or more thread groups and inaccessible to the other thread group or groups in the set of two or more thread groups that are to be merged; and storing any data item from before the thread group merge event point that needs to be preserved across the thread group merge event in the common registers for the set of two or more thread groups.

* * * * *